US008531449B2

(12) United States Patent
Lynch et al.

(10) Patent No.: US 8,531,449 B2
(45) Date of Patent: Sep. 10, 2013

(54) SYSTEM AND METHOD FOR PRODUCING MULTI-ANGLE VIEWS OF AN OBJECT-OF-INTEREST FROM IMAGES IN AN IMAGE DATASET

(75) Inventors: James Lynch, Chicago, IL (US); William Gale, Oak Park, IL (US)

(73) Assignee: Navteq B.V., Veldhoven (NL)

( * ) Notice: Subject to any disclaimer, the term of this patent is extended or adjusted under 35 U.S.C. 154(b) by 940 days.

(21) Appl. No.: 12/002,746

(22) Filed: Dec. 18, 2007

(65) Prior Publication Data

US 2009/0153549 A1    Jun. 18, 2009

(51) Int. Cl.
*G06T 15/00* (2011.01)

(52) U.S. Cl.
USPC ............... 345/419; 345/629; 340/995.17

(58) Field of Classification Search
None
See application file for complete search history.

(56) References Cited

U.S. PATENT DOCUMENTS

| | | | |
|---|---|---|---|
| 5,161,886 A | 11/1992 | De Jong et al. | 364/449 |
| 5,774,569 A | 6/1998 | Waldenmaier | |
| 6,222,583 B1 | 4/2001 | Matsumura et al. | |
| 6,363,161 B2 | 3/2002 | Laumeyer et al. | |
| 7,155,336 B2 | 12/2006 | Dorfman et al. | 701/200 |
| 7,216,035 B2 | 5/2007 | Hortner et al. | 701/211 |
| 7,239,760 B2 | 7/2007 | Di Bernardo et al. | 382/305 |
| 7,272,501 B2 | 9/2007 | Dorfman et al. | 701/213 |
| 7,688,229 B2 | 3/2010 | Sula et al. | |
| 2002/0113791 A1 | 8/2002 | Li et al. | |
| 2003/0026469 A1* | 2/2003 | Kreang-Arekul et al. | 382/132 |
| 2004/0090523 A1 | 5/2004 | Kondo et al. | |
| 2004/0098175 A1 | 5/2004 | Said et al. | 701/1 |
| 2006/0120592 A1 | 6/2006 | Park et al. | |
| 2007/0118281 A1 | 5/2007 | Adam et al. | |
| 2007/0206945 A1 | 9/2007 | DeLorme et al. | 396/332 |
| 2008/0112610 A1 | 5/2008 | Israelsen et al. | |
| 2008/0211914 A1* | 9/2008 | Herrera et al. | 348/148 |
| 2009/0110239 A1 | 4/2009 | Chen et al. | |

OTHER PUBLICATIONS

Bell, B., Feiner, S., Hollerer, T., View Management for Virtual and Augmented Reality, Nov. 2001, ACM Symp. on User Interface Software and Technology, pp. 101-110.*

* cited by examiner

*Primary Examiner* — Said Broome
(74) *Attorney, Agent, or Firm* — Lempia Summerfield Katz LLC

(57) ABSTRACT

Disclosed are a system and method for creating multi-angle views of an object-of-interest from images stored in a dataset. A user specifies the location of an object-of-interest. As the user virtually navigates through the locality represented by the image dataset, his current virtual position is determined. Using the user's virtual position and the location of the object-of-interest, images in the image dataset are selected and interpolated or stitched together, if necessary, to present to the user a view from his current virtual position looking toward the object-of-interest. The object-of-interest remains in the view no matter where the user virtually travels. From the same image dataset, another user can select a different object-of-interest and virtually navigate in a similar manner, with his own object-of-interest always in view. The object-of-interest also can be "virtual," added by computer-animation techniques to the image dataset. For some image datasets, the user can virtually navigate through time as well as through space.

17 Claims, 26 Drawing Sheets

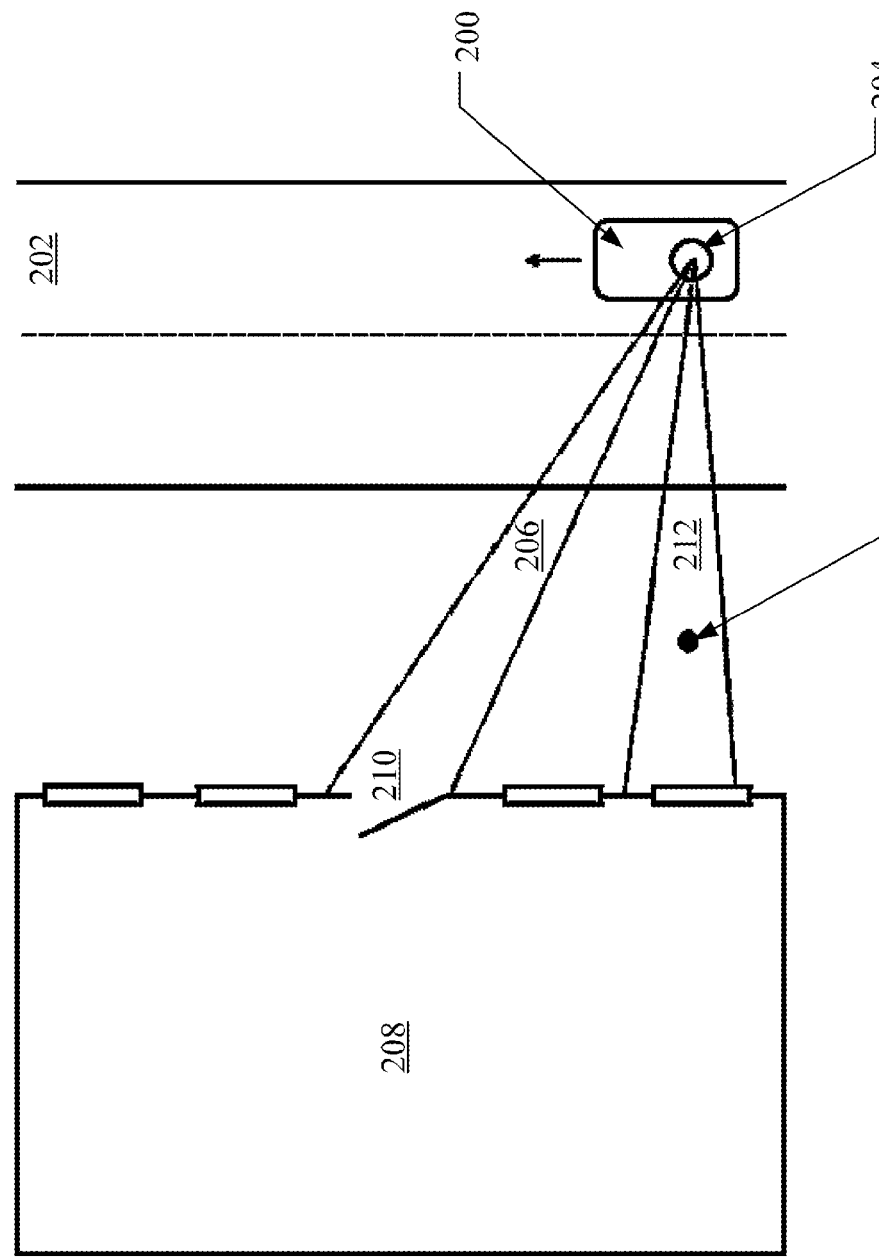

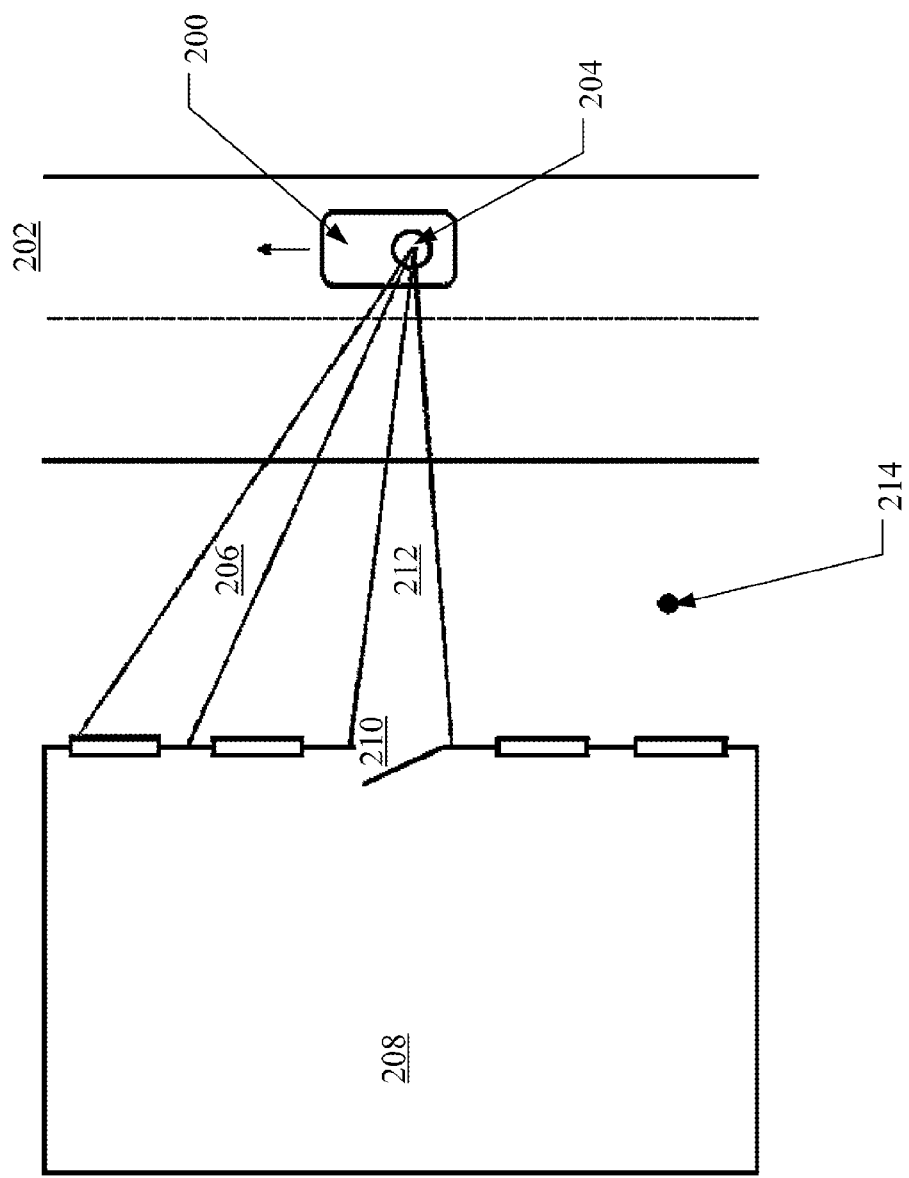

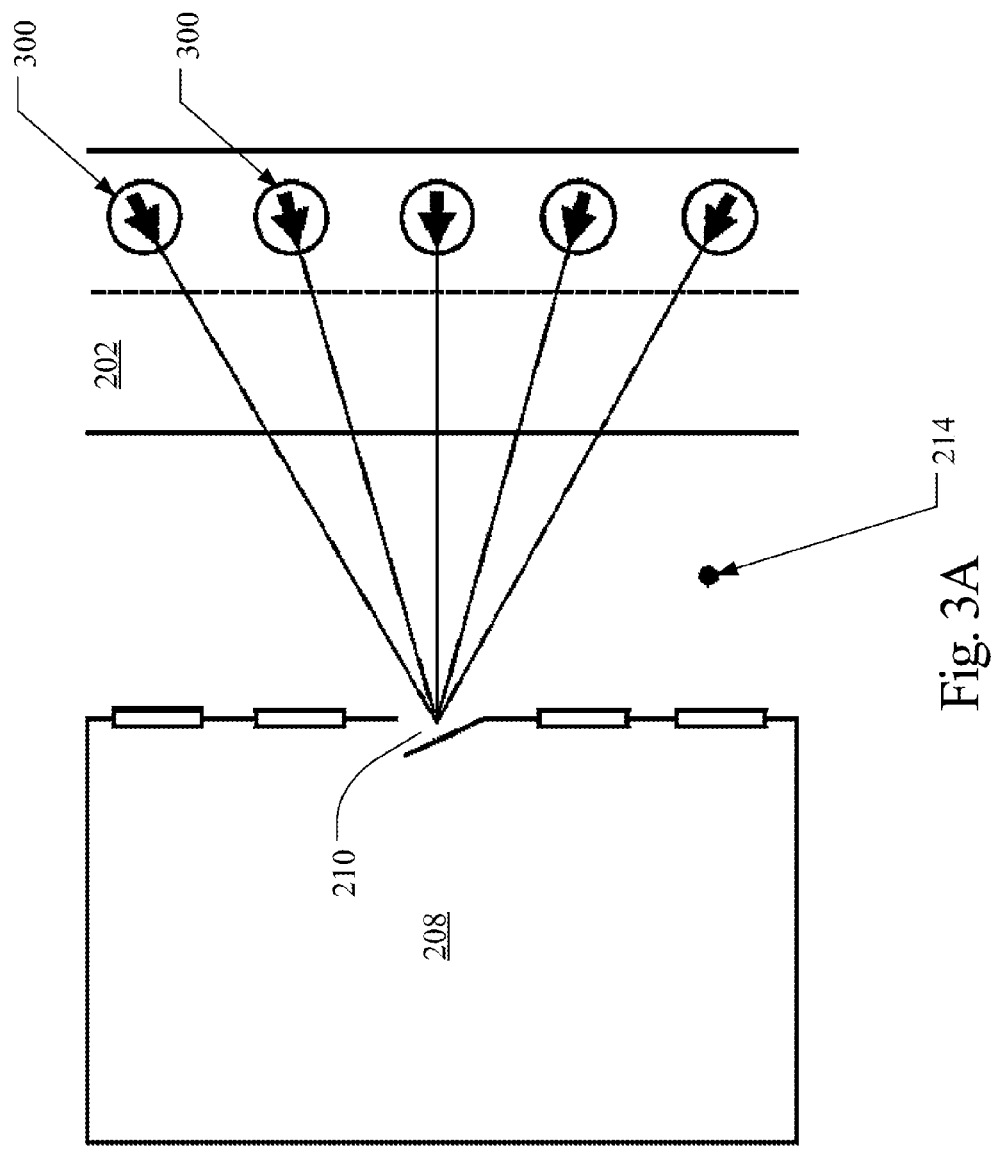

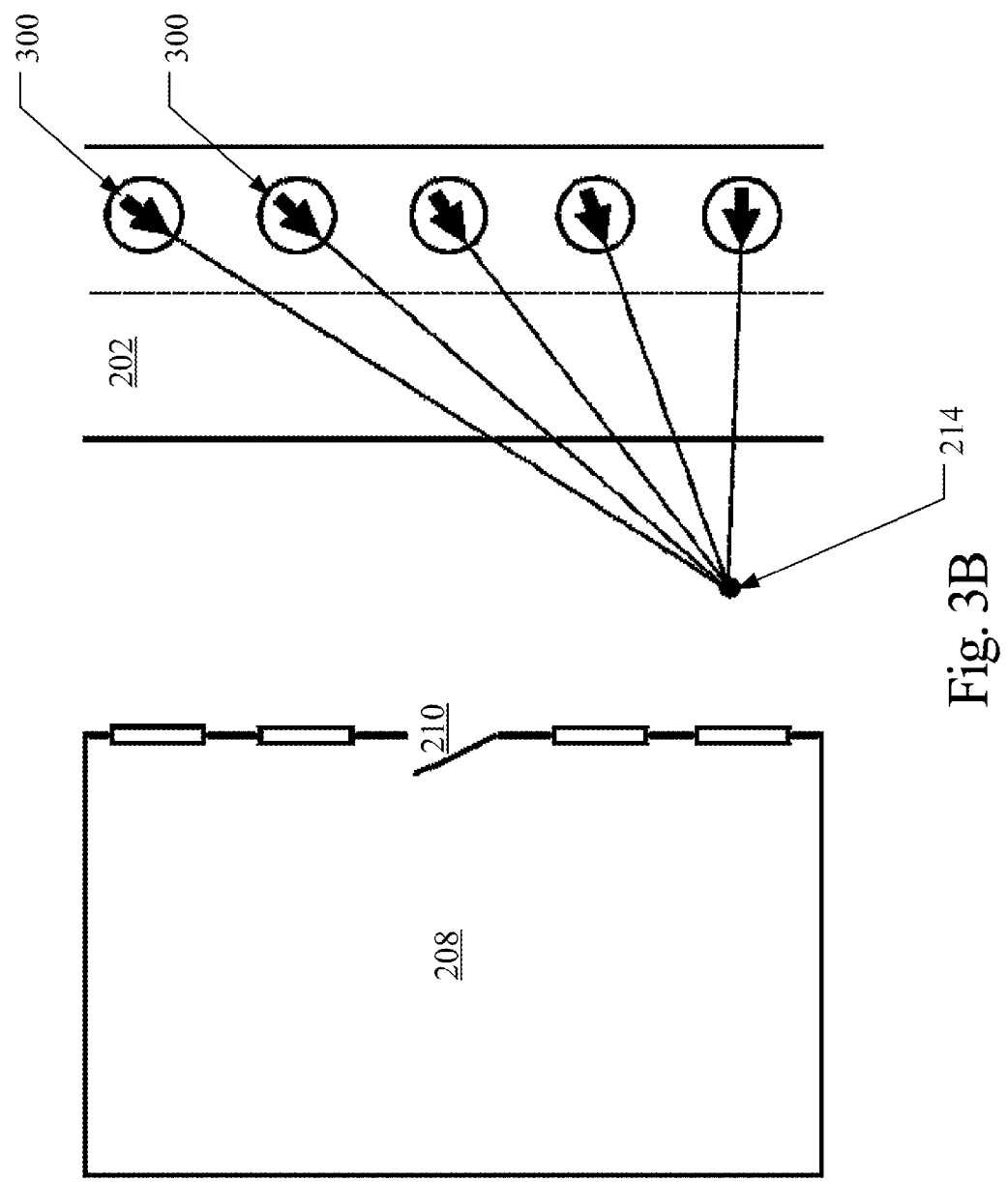

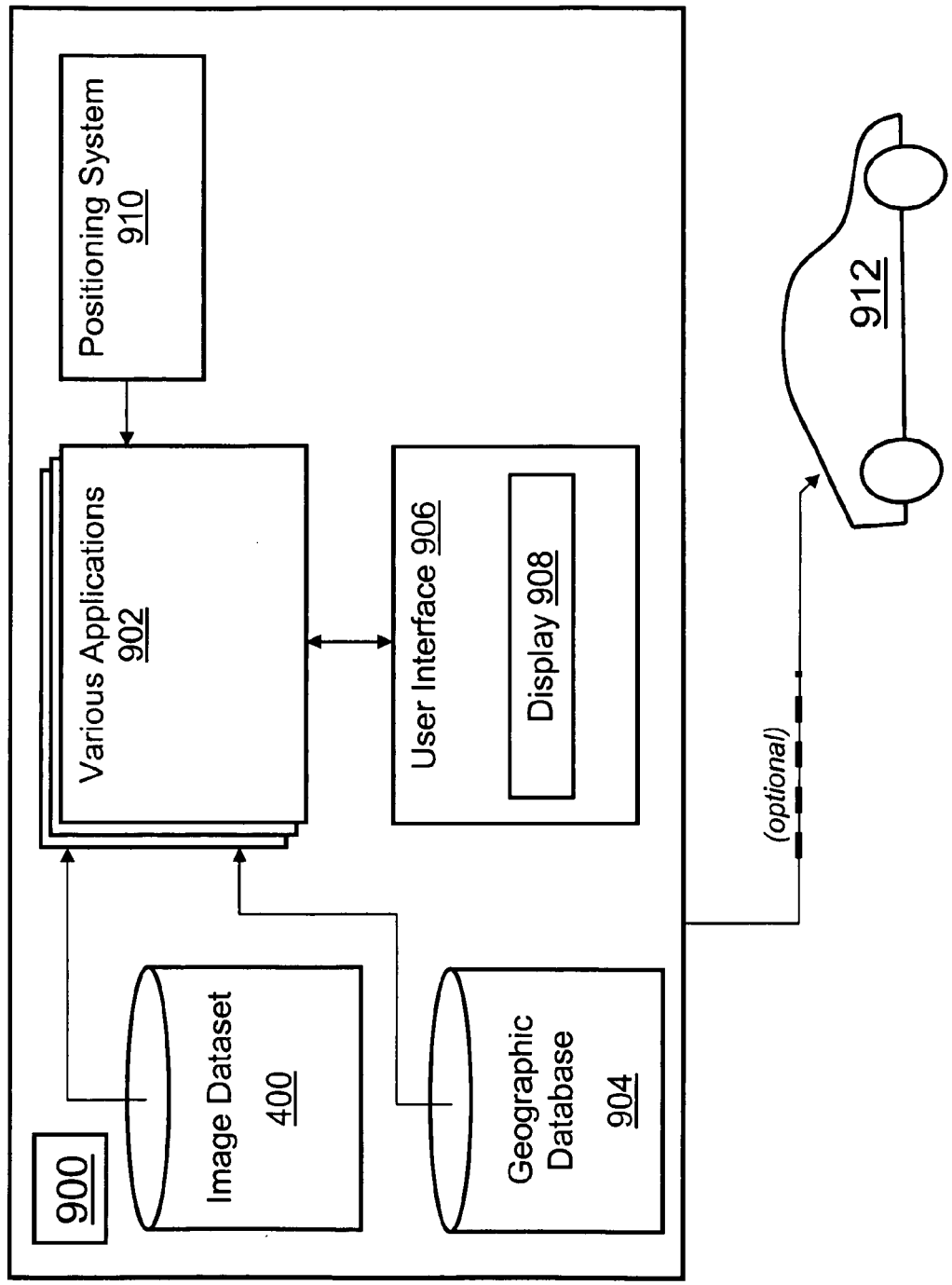

SYSTEM AND METHOD FOR PRODUCING MULTI-ANGLE VIEWS OF AN OBJECT-OF-INTEREST FROM IMAGES IN AN IMAGE DATASET

FIELD OF THE INVENTION

The present invention is related generally to collections of images, and, more particularly, to processing images to produce views of an object-of-interest.

BACKGROUND OF THE INVENTION

Image-based navigation has become popular. In one type of system, a computer displays to a user photographic images taken in a real-world locality. The user navigates through a representation of the depicted locality by changing his virtual location or by "turning his head." The computer keeps up with the user's navigation and displays photographic images taken from the real-world locality that represent the user's current point of view. Thus, the user is given a virtual, visual tour of the real-world locality. One system for performing this kind of feature is disclosed in U.S. patent application Ser. No. 11/796,789, filed on Apr. 30, 2007, the entire disclosure of which is incorporated by reference herein.

An image dataset may lie behind the navigation application. The images used for this application are collected by a set of one or more cameras carried through the locality. The camera may be mounted on a vehicle or carried by a person on foot. The cameras take pictures (or video) in all directions as the vehicle or person moves. Because numerous, overlapping pictures are taken from several points of view, the set of pictures can be post-processed to create seamless 360-degree images, as disclosed in Ser. No. 11/796,789. These images are correlated with real-world geography, for example by gathering GPS data at the same time as the pictures are taken.

Sometimes a user's attention is drawn to one particular "object-of-interest" when he navigates the locality depicted in an image dataset. For example, the user may be an architect assessing the visual impact of a structure (already in place or only planned) on the neighborhood. To help the user view his object-of-interest from as many angles as possible, a "multi-angle object-of-interest video" can be created. This video is created by traveling around the neighborhood while training a video camera on the object-of-interest. (If the structure is only virtual, then the camera is focused on the proposed location of the structure. Afterwards, known computer-animation techniques are used to insert the proposed structure into the video.) This type of video requires a good deal of time and expertise to create and, once created, the resulting video is inflexible and is applicable only to the object-of-interest specified before the video was made.

BRIEF SUMMARY OF THE INVENTION

The above considerations, and others, are addressed by the present invention, which can be understood by referring to the specification, drawings, and claims. According to aspects of the present invention, multi-angle views of an object-of-interest are created from existing images stored in an image dataset. In some embodiments, a user specifies the geographic location of an object-of-interest. The user then virtually navigates through the locality represented by the image dataset. As he navigates, his current virtual position is determined. Using the user's current virtual position and the location of the object-of-interest, images in the image dataset are selected and interpolated or stitched together, if necessary, to present to the user a view from his current virtual position looking toward the object-of-interest. The object-of-interest remains in the view no matter where the user virtual travels.

From the same image dataset, another user can select a different object-of-interest and virtually navigate in a similar manner, with his own object-of-interest continuously (or nearly continuously) in view. Embodiments of the present invention do not require that additional images be collected to create the multi-angle views, neither need the object-of-interest be specified before the image dataset is populated.

Various embodiments employ several techniques, separately or together, when populating an image dataset so that it can provide multiple views of an object-of-interest. The images in the dataset can be "registered," that is, when the images are collected, the objects in the images are associated with their geographic locations. For example, a GPS unit on the camera tells where the camera was located when an image was taken and the direction in which the camera was facing. A range-finding device (e.g., LIDAR) tells how far away an object in the image is from the location of the camera.

Some of the views presented to the user may include objects that occlude other objects, including the object-of-interest. To enhance the views of the object-of-interest, these occluding objects may be removed or de-emphasized using techniques described in U.S. patent application Ser. No. 11/980,003, filed on Oct. 30, 2007, the entire disclosure of which is incorporated by reference herein.

In some embodiments, the object-of-interest need not actually exist in the images in the dataset. Instead, computer-animation techniques are used to add a "virtual" object-of-interest at a specified location. The above process is then followed to prepare the multi-angle views.

In some embodiments, the user can virtually navigate through time as well as through space. Here, the views presented to the user, continuously (or nearly continuously) in the direction of the selected object-of-interest, can show, for example, the change of seasons or the development of a structure through time.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 2A is an overhead schematic of a vehicle collecting images in a street locality; in this view, a forward-facing camera images a doorway while at the same time a side-facing camera images a signpost;

FIG. 2B is similar to FIG. 2A, but the vehicle has moved down the street to a position where the side-facing camera now images the doorway;

FIG. 3A is an overhead schematic showing multi-angle points-of-view where the selected object-of-interest is the doorway of FIGS. 2A and 2B;

FIG. 3B is similar to FIG. 3A, but now the selected object-of-interest is the signpost of FIGS. 2A and 2B;

FIG. 9 is a schematic of an exemplary end-user computing platform that presents to a user multi-angle views of his selected object-of-interest.

DETAILED DESCRIPTION OF THE INVENTION

Figure 1A:
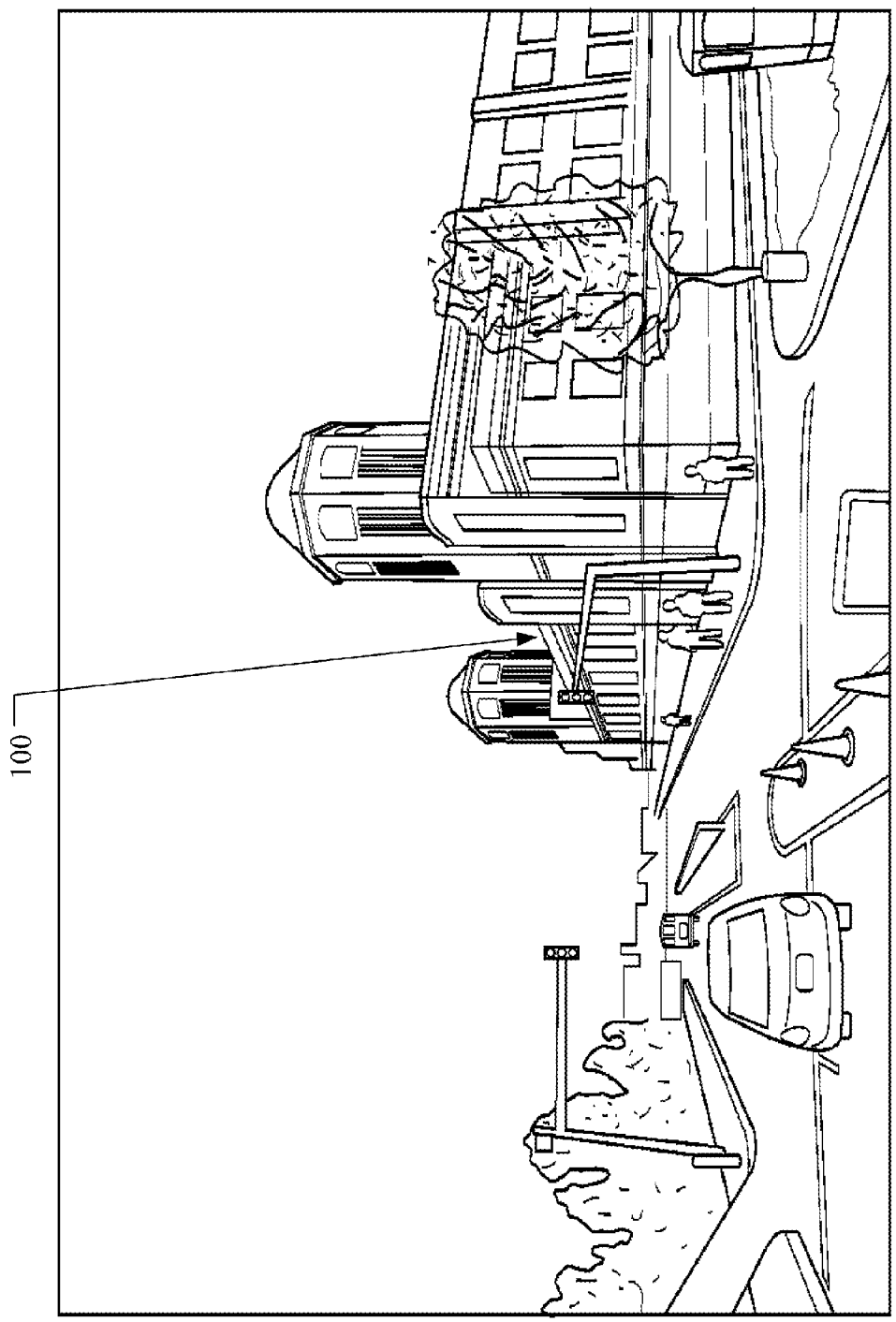
FIG. 1A through 1F are views of a street locality as seen from multiple locations but all directed toward the same object-of-interest.
Figure 1B:
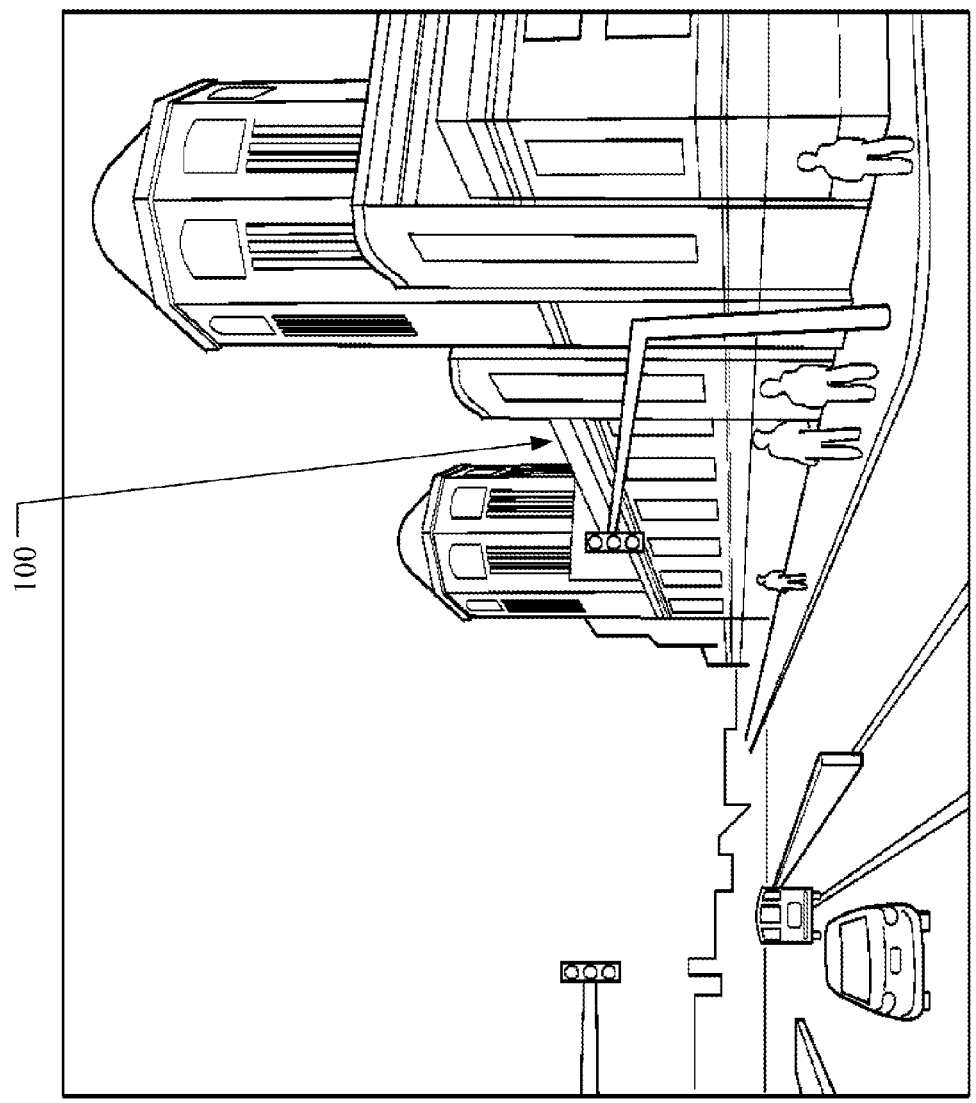
Figure 1C:
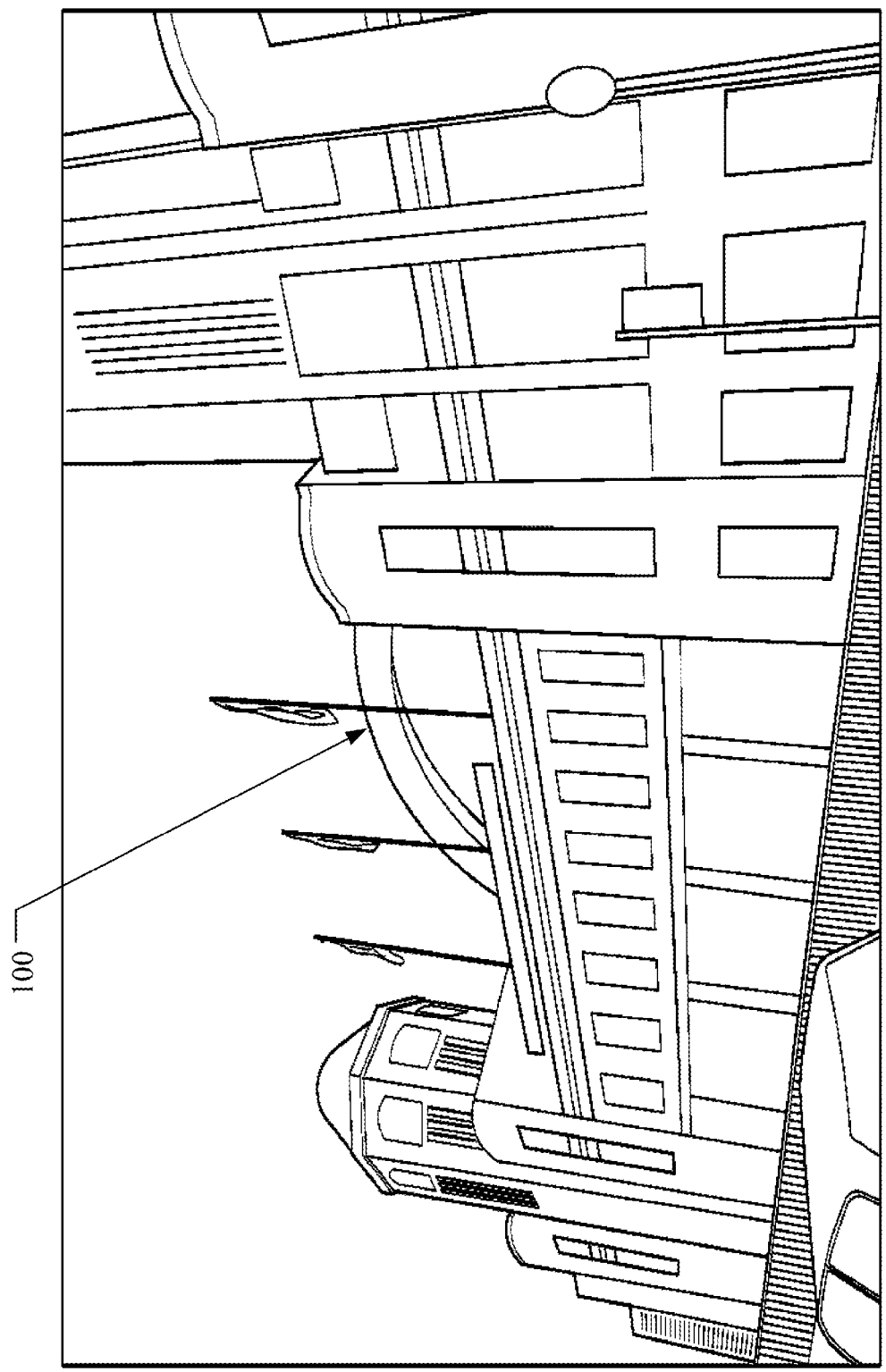
Figure 1D:
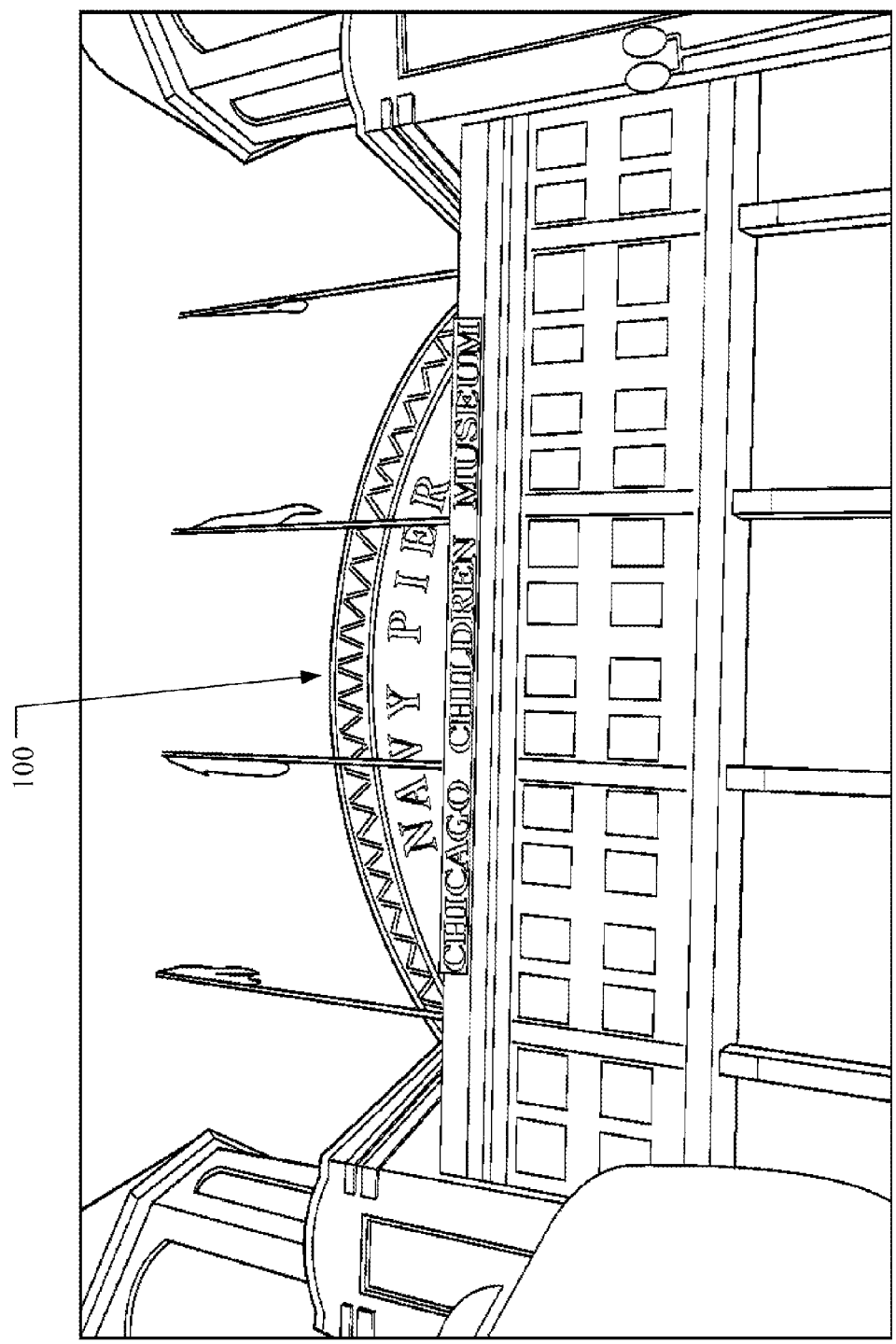
Figure 1E:
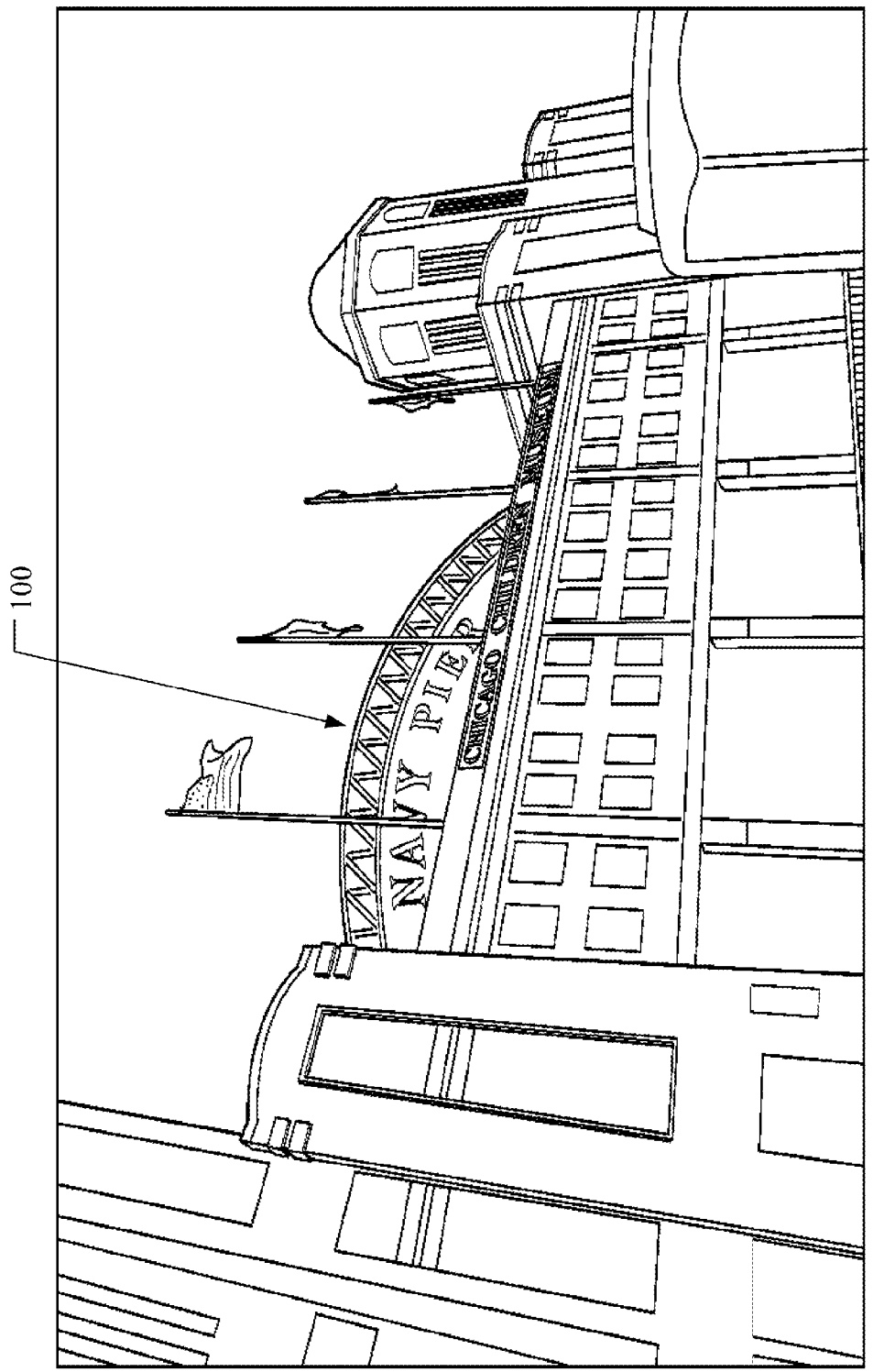
Figure 1F:
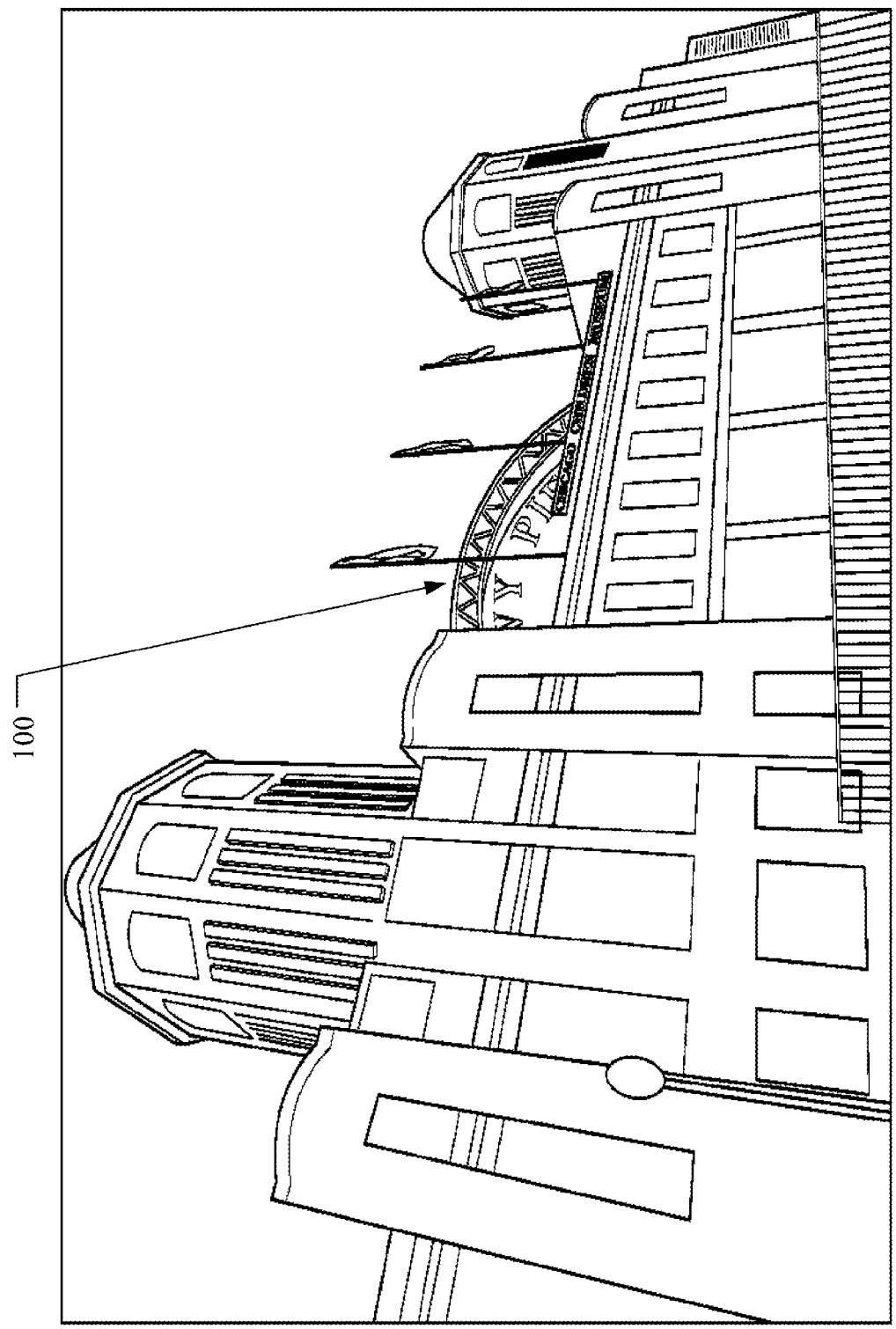

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

FIG. 1A through 1F together illustrate the use of multi-angle views of an object-of-interest. For instance, a user may be an architect interested in studying the visual impact of a building on its surrounding neighborhood. The user specifies the location of the building as his object-of-interest 100. Then the user runs an application that allows him to virtually navigate throughout the neighborhood of the object-of-interest 100. The application uses images of the neighborhood taken from an image dataset. The images are processed, if necessary, to present a view from the user's current location (the "viewpoint") looking toward the object-of-interest 100.

In the street scene of FIG. 1A, the object-of-interest 100 is ahead and to the right of the user's current viewpoint. Progressing from FIG. 1A to FIG. 1F, the user navigates down the street so that the viewpoint in each figure is a little farther down the street than the viewpoint in the previous figure. In each figure, the view presented to the user is that taken from the location of the current viewpoint looking toward the selected object-of-interest 100. At FIG. 1D, the viewpoint is directly across the street from the object-of-interest 100 which is here clearly seen to be the facade of a museum.

While the example of FIG. 1A through 1F shows multi-angle views taken in a linear progression down one street, in some embodiments the user navigates by moving his viewpoint in any direction (including up and down). By processing the user's viewpoint-navigation choices quickly, the resulting views are presented as a video continuously, or nearly continuously, looking toward the object-of-interest 100.

The user (or another user) can select a new object-of-interest and run through the above process again. The images from the image dataset are processed so that the views presented to the user are continuously, or nearly continuously, directed toward the new object-of-interest.

Some embodiments allow the user to add a virtual object and to specify its location in the neighborhood represented by the image dataset. The user then selects the location of the virtual object as his object-of-interest and runs through the above process. For example, the user adds a virtual street sign and then navigates through the neighborhood to test whether the sign is sufficiently visible from multiple viewpoints.

FIGS. 2A and 2B illustrate an exemplary system for populating an image dataset to be used by an application presenting multi-angle views of an object-of-interest. (For example, this system can be used to provide the images used to create the views of FIG. 1A through 1F.) The system in these figures collects images of a locality in the real world. In FIG. 2A, a vehicle 200 is driving down a road 202. The vehicle 200 includes an image-capture system 204. The image-capture system 204 may include multiple cameras taking overlapping still images or video of both sides of the road 202. The images or video are in a suitable format, such as *.jpg, *.mpg, *.avi, *.bmp, *.mov, etc. The vehicle 200 also includes a system for determining its present location, such as a GPS receiver. As the vehicle 200 proceeds down the road 202, the captured images are stored and are associated with the geographical location at which each picture was taken.

In some implementations, the image-capture system 204 includes a range-finding device, such as LIDAR. The image-capture system 204 and the range-finding device are "registered" so that the distance from the image-capture system 204 to whatever it is viewing is detected and recorded. With such a system, a portion of a captured image (such as every pixel or a group of pixels) is associated with the distance from the image-capture system 204 to the object in the portion of the image. When a range-finding device is combined with the vehicle's location-determination system (e.g., GPS), the precise real-world geographic location of every pixel is known. When stored with this location information, the resulting pixels are called "3D pixels."

The image-capture system 204 can include multiple cameras, or a single camera with multiple lenses. As the vehicle 200 drives down the road 202, the cameras capture images of various areas of the building 208. 206 is the point-of-view of a forward-facing camera. In FIG. 2A, this camera is capturing an image of a doorway 210 of the building 208. At the same time, the point-of-view 212 of a sideways-facing camera includes a signpost 214 located in front of the building 208.

As the vehicle 200 proceeds down the road 202, areas of the building 208 originally imaged by one camera are now imaged again by other cameras (or by the same camera from another vantage point). For example, in FIG. 2B the doorway 210 is now imaged by the sideways-facing camera with the point-of-view 212. (In many embodiments, each camera in the image-capture system 204 maintains a fixed orientation with respect to the vehicle 200. In other embodiments, the cameras pan as the vehicle 200 moves.) The images captured by the system of FIGS. 2A and 2B are stored in an image dataset.

Figure 3C:
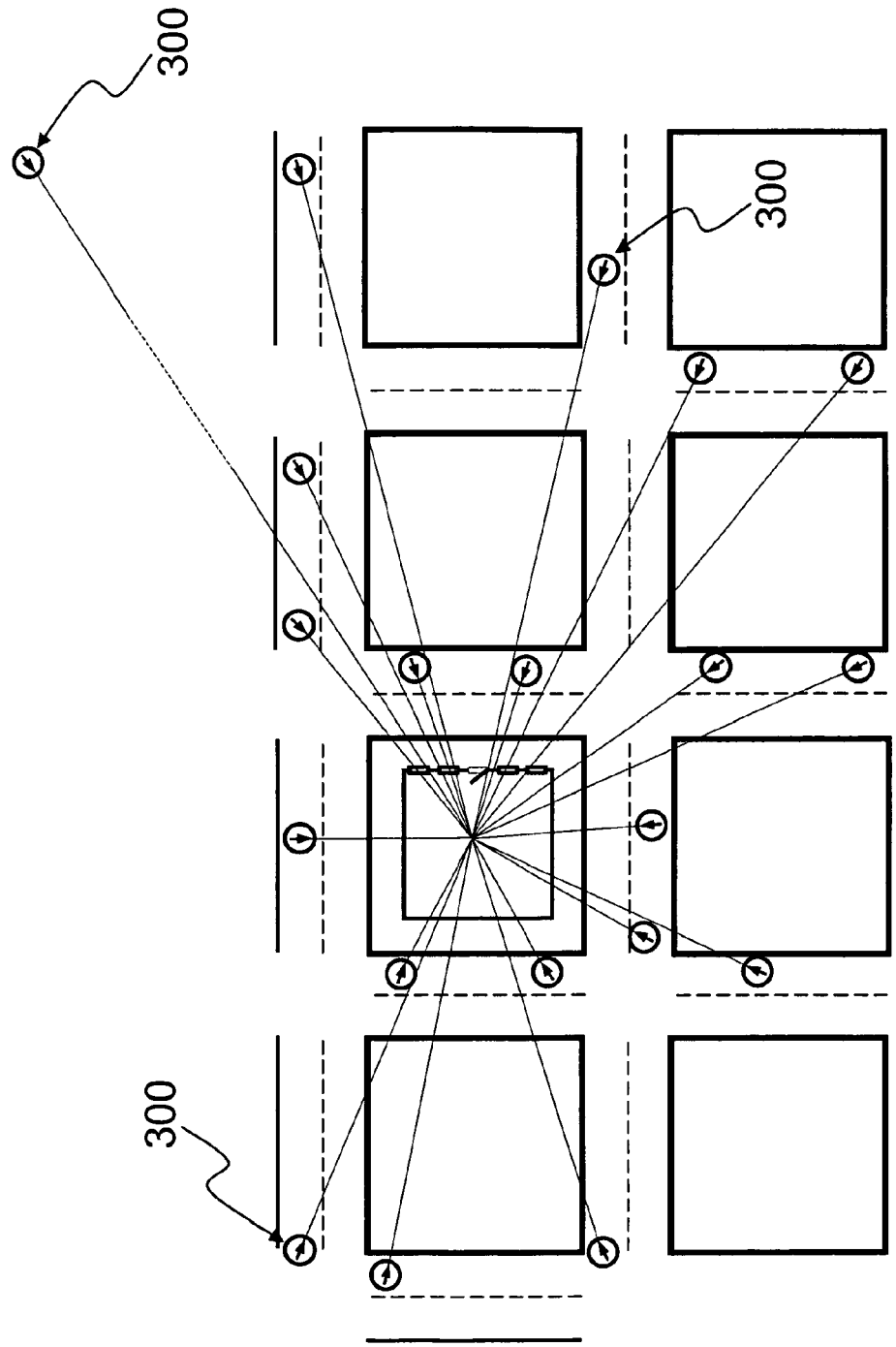
FIG. 3C is an overhead schematic showing multi-angle points-of-view distributed throughout a neighborhood surrounding a selected object-of-interest.

However, the image dataset populated by the system of FIGS. 2A and 2B may not be sufficient, without further processing, to provide multi-angle views of a selected object-of-interest. This issue is illustrated by FIG. 3A through 3D. In FIG. 3A, a user has selected as his object-of-interest the doorway 210 of the building 208. The user runs an application to virtually navigate his viewpoint down the street 202. At each point on the street 202, the view presented to the user should be directed toward the doorway 210, as illustrated by the exemplary viewpoints 300. From several of these viewpoints 300, however, no image was captured by the system 204 of FIGS. 2A and 2B. For example, the topmost view 300 of FIG. 3A looks backward to the doorway 210, but the exemplary image-capture system 204 of FIGS. 2A and 2B does not include a backward-facing camera.

In the prior art, multi-angle views can be created by constantly aiming a camera toward the doorway 210 as the image-capture system 204 is moved down the road 202. However, this requires that the object-of-interest be known in advance, before the images are captured. Also, the effort expended when creating the multi-angle views directed toward the doorway 210 as an object-of-interest are of no use when another object-of-interest is selected. For example, in FIG. 3B another user has chosen the street sign 214 as his object-of-interest. Using the prior art, another image-capture pass would have to be made down the street 202 to create multi-angles views of this second object-of-interest.

The examples in FIGS. 3A and 3B are simplified in order to clearly portray some of the issues involved in creating multi-angle views. For some situations, FIG. 3C more realistically portrays the multi-angle views that a user wants. Here, the user wants more than a set of views taken along a single street. FIG. 3C shows an exemplary set of viewpoints 300 taken from positions distributed throughout the neighborhood surrounding the selected object-of-interest. To collect all of the multi-angle views of FIG. 3C, a prior-art system would require multiple dedicated image-capture passes down all the streets of the neighborhood.

Figure 3D:
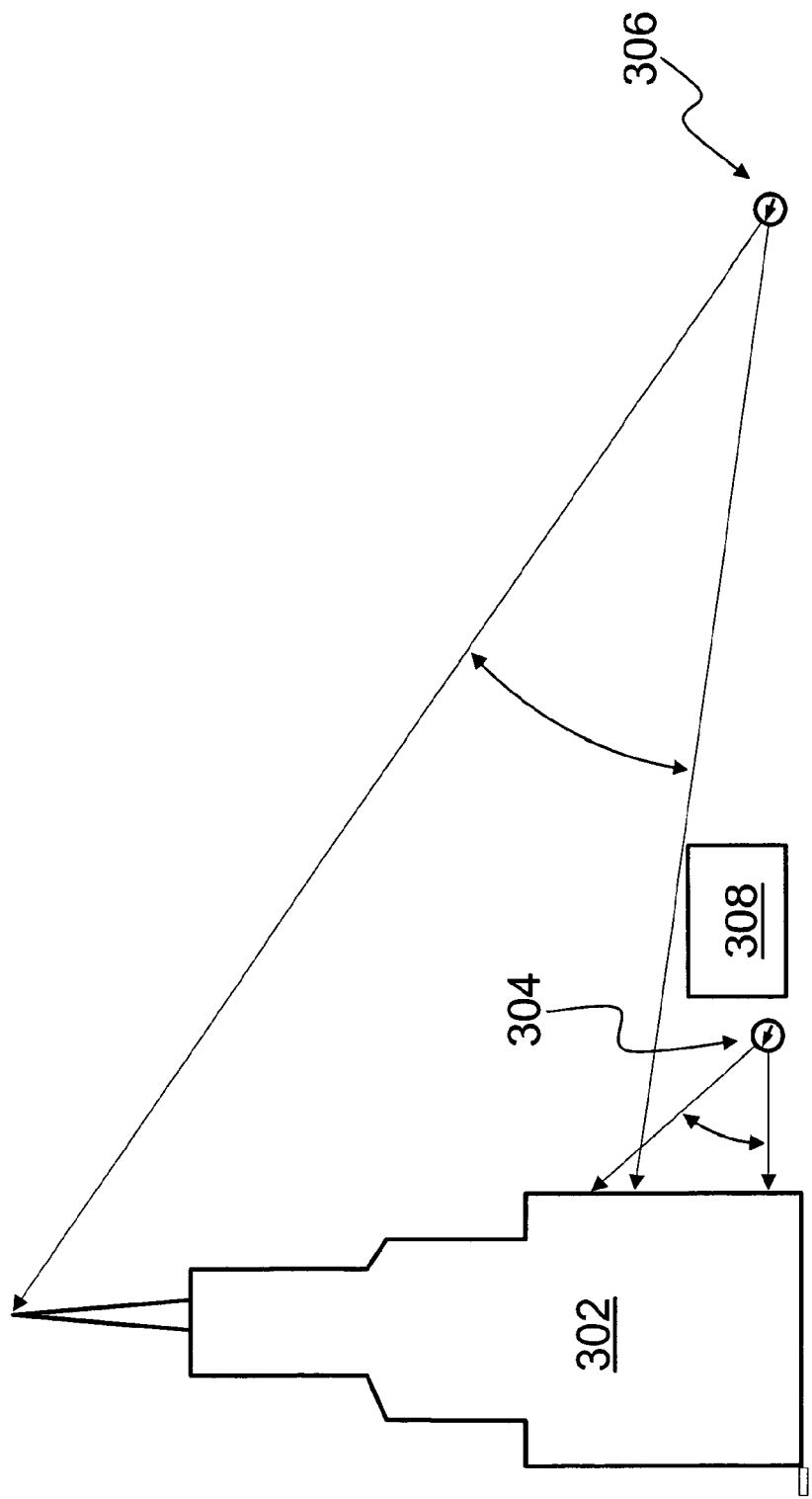
FIG. 3D is a schematic where the selected object-of-interest is a tall building in a visually crowded neighborhood.

As a final example, FIG. 3D illustrates another scenario beyond the scope of prior-art systems. The selected object-of-interest is a tall building 302 standing in a visually crowded neighborhood. As in the scenario of FIG. 3C, the user wants multi-angle views taken from positions all over the neighborhood. However, the intervening buildings introduce a new problem. From a viewpoint 304 located at the base of the building 302, the building 302 is unobstructed, but the height of the building 302 means that only the lower portion of the building 302 is visible. From viewpoints such as 306 farther from the base of the building 302, the top of the building 302 is clearly visible, but an intervening structure 308 blocks the view of the lower portion of the building 302. The user wants to see, from multiple angles, views of the entire building 302. The prior art, even using a series of dedicated image-capture passes, does not present to the user the complete multi-angle views that are required.

Aspects of the present invention, as described below, alleviate the need for a dedicated image-gathering pass for each object-of-interest and address the other issues discussed above.

Figure 4:
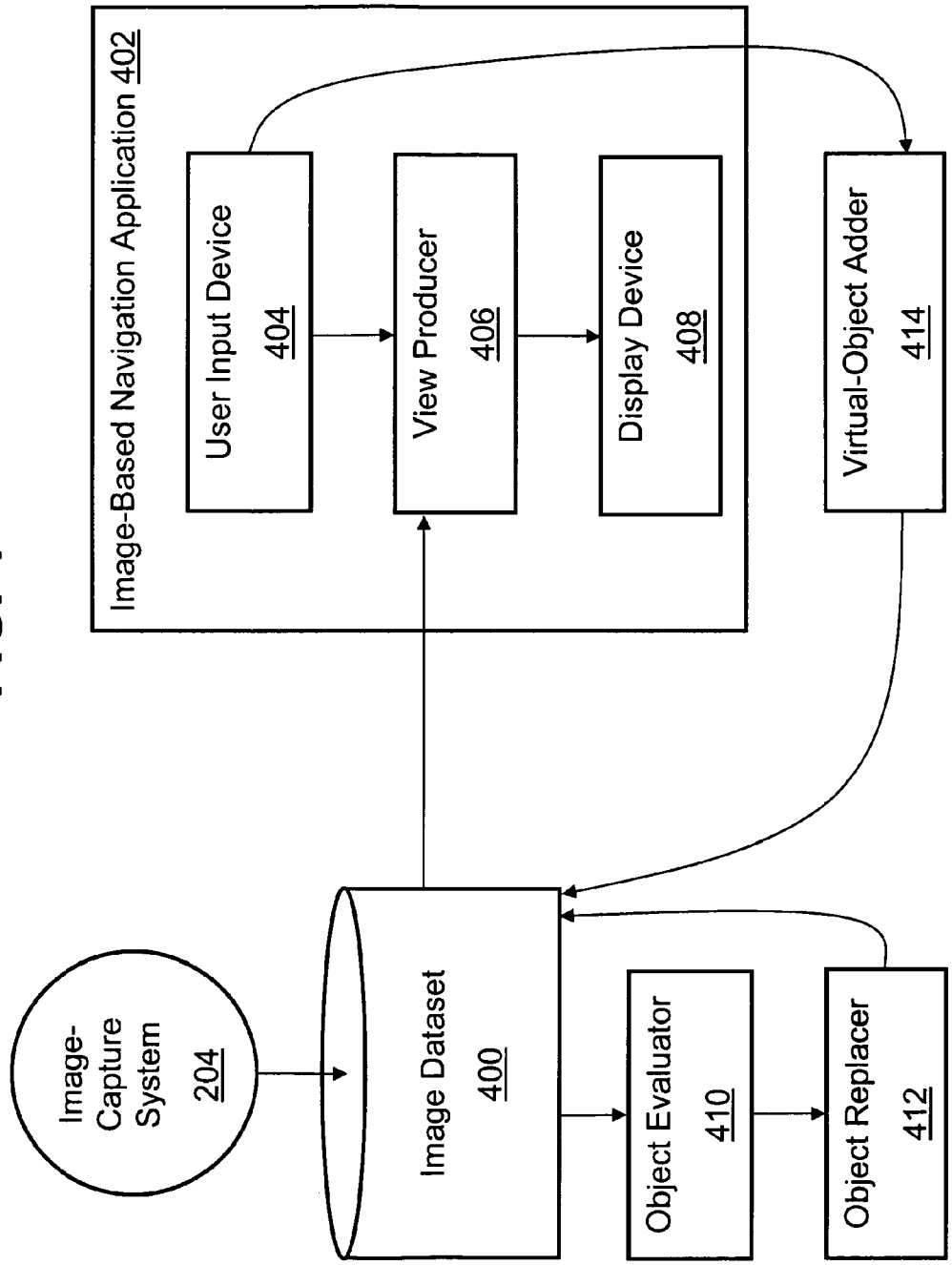
FIG. 4 is a schematic of an exemplary system for collecting images into an image dataset and for post-processing the image dataset to produce multi-angle views of an object-of-interest.
Figure 5:
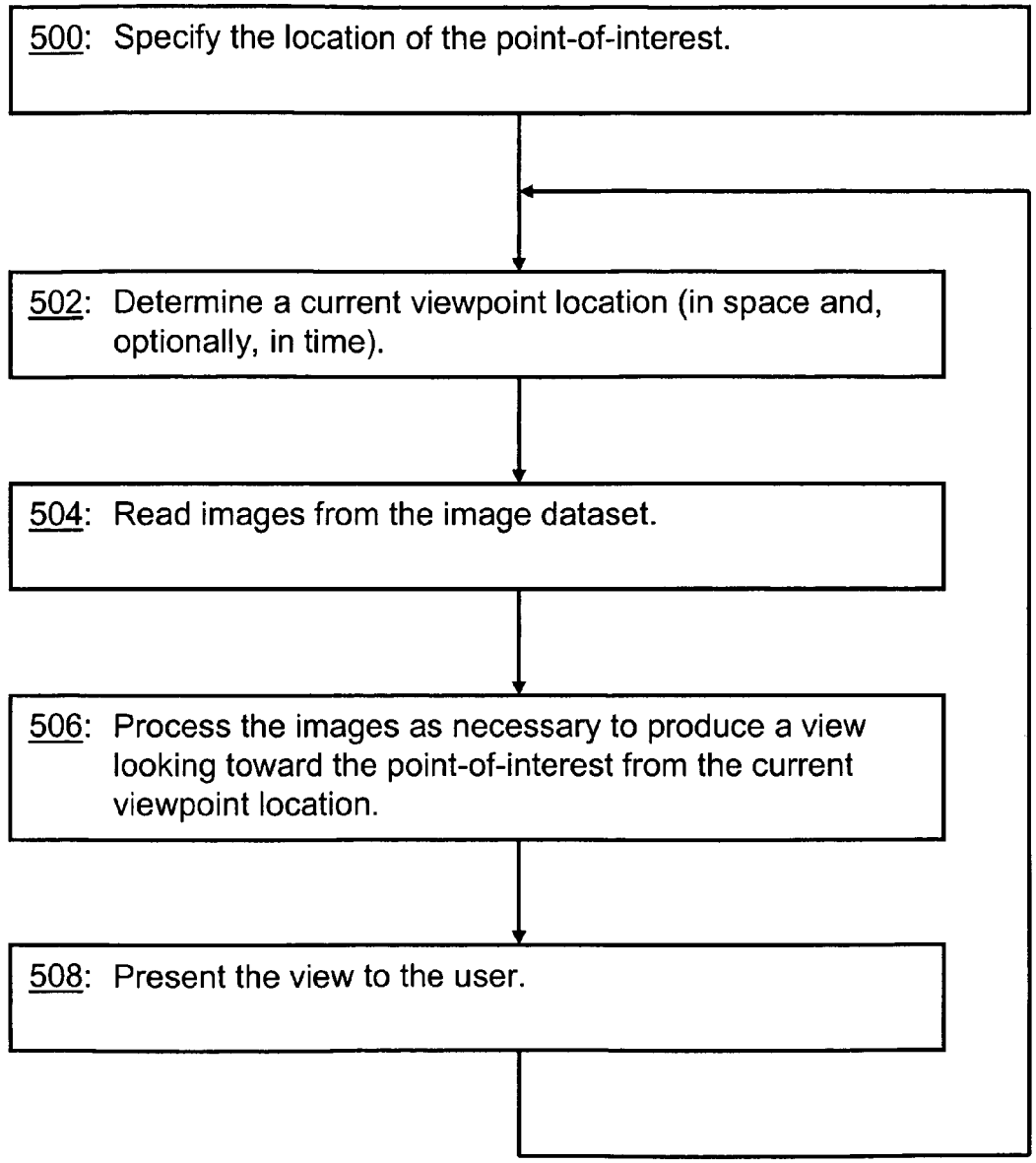
FIG. 5 is a flowchart of an exemplary method for producing multi-angle views of an object-of-interest.

An exemplary system for storing and then processing captured images is presented in FIG. 4. An exemplary method for using this system is illustrated in FIG. 5. The image-capture system 204 of FIGS. 2A and 2B delivers its images to an image dataset 400. The image dataset 400 is stored on any of a number of computer-readable media. For example, it may be stored on one or more hard drives at one or more locations. During use and processing, portions of the image dataset 400 can be loaded into a computer's RAM or ROM. When the image dataset 400 is transformed or processed as disclosed, the resulting product is stored on the same computer-readable medium or on another one. The image dataset 400, in whole or in part, may be distributed to users on a tangible medium, such as a CD, or may be transmitted over a network such as the Internet or over a wireless link to a user's mobile system.

The image-based navigation application 402 allows a user to virtually move around the neighborhood represented by the image dataset 400. With an input device 404, the user specifies the location of an object-of-interest. (Step 500 of FIG. 5.) As the user virtually navigates through the neighborhood, the user's virtual location is noted and passed on to the view producer 406. (Step 502.) The view producer 406 reads images from the image dataset 400 (step 504) and transforms them to create a view looking from the user's current virtual location to the selected object-of-interest (step 506). If the image dataset 400 does not include an image taken from the current virtual viewpoint and directed toward the selected object-of-interest, then the view producer 406 takes views that are close to the desired view and interpolates or "stitches" them together, using techniques such as those disclosed in Ser. No. 11/796,789, to present a seamless view toward the object-of-interest. To present views from positions taken throughout a neighborhood, the view producer 406 can read images captured in multiple passes down multiple streets in the neighborhood and stitch them together. The created view is then presented to the user on a display device 408 (or stored on a computer-readable medium). (Step 508.) This process is repeated as the user virtually moves around and changes his viewpoint.

Figure 6:
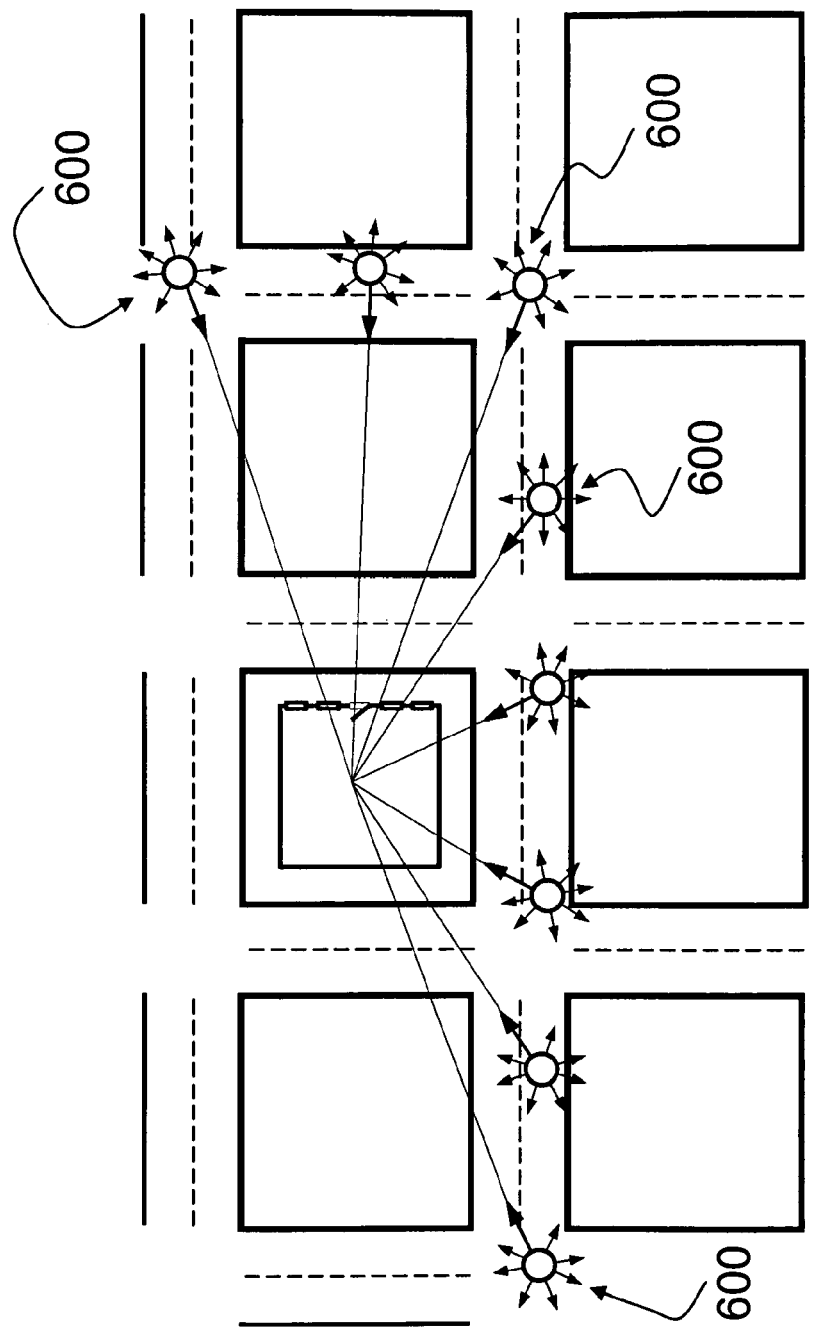
FIG. 6 is an overhead schematic of the same neighborhood as shown in FIG. 3C showing how images are captured to produce multi-angle points-of-view of a selected object-of-interest, according to aspects of the present invention.
Figure 7A:
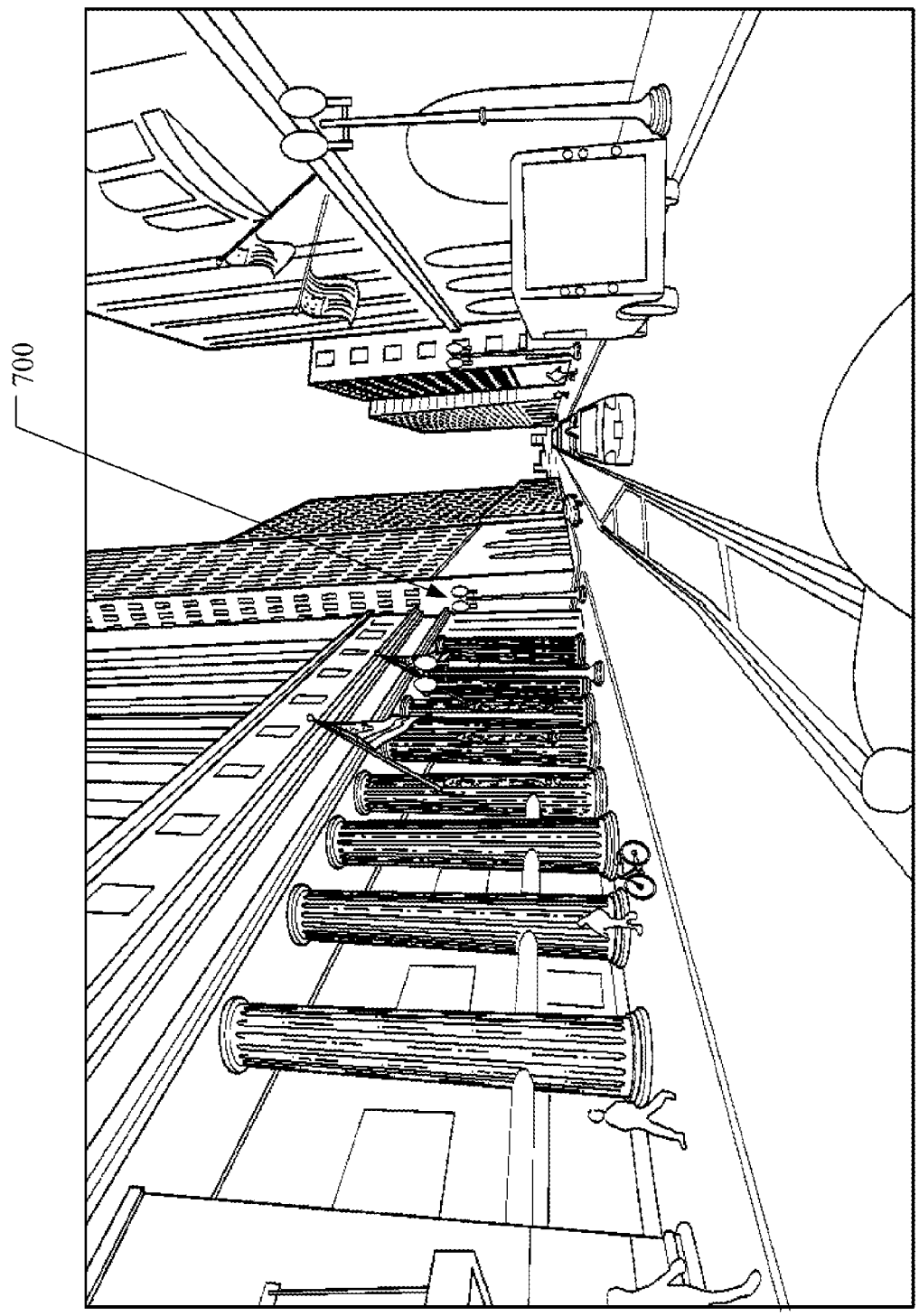
FIG. 7A through 7E are views of a street locality as seen from multiple locations but all directed toward the same object-of-interest.
Figure 7B:
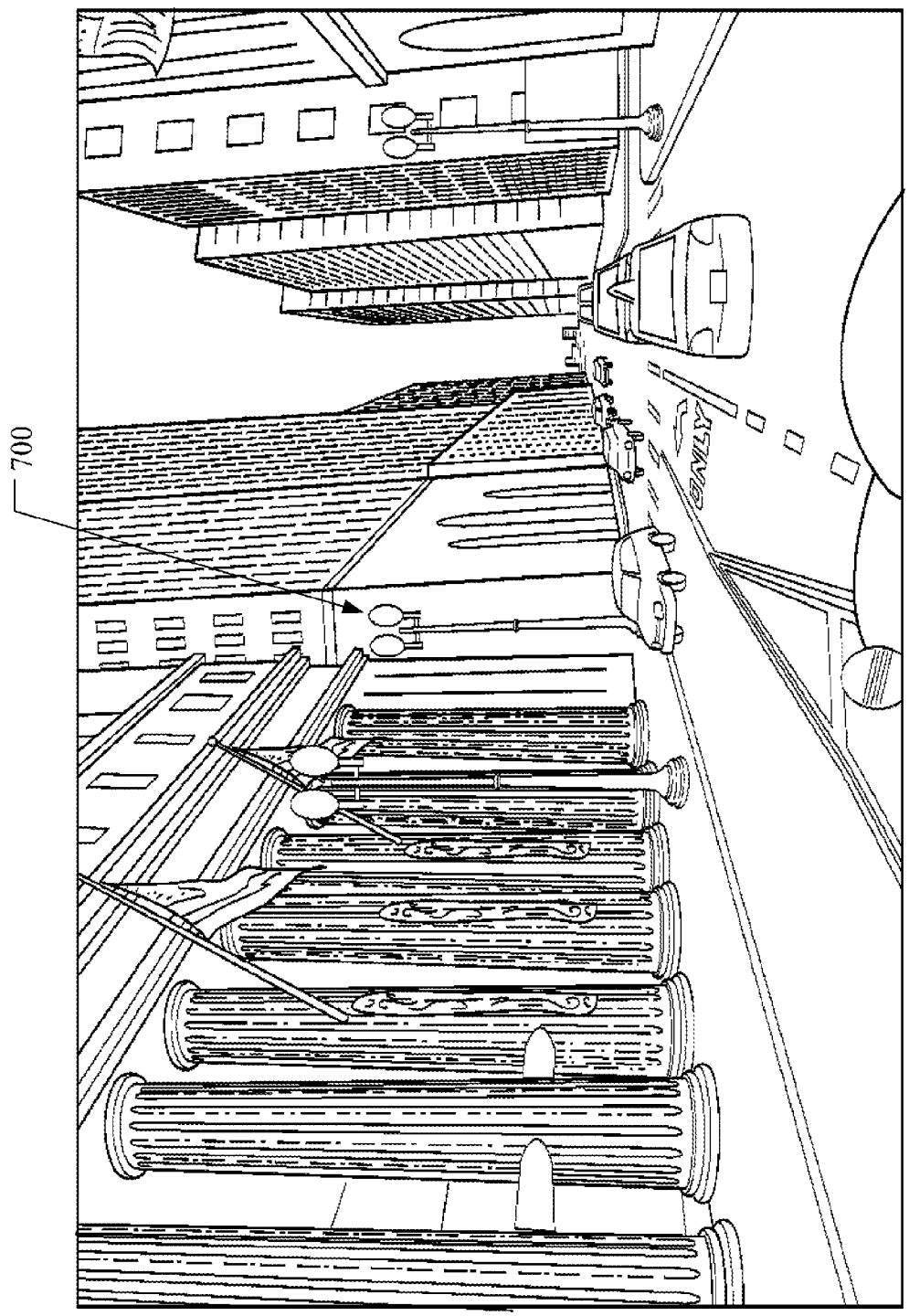
Figure 7C:
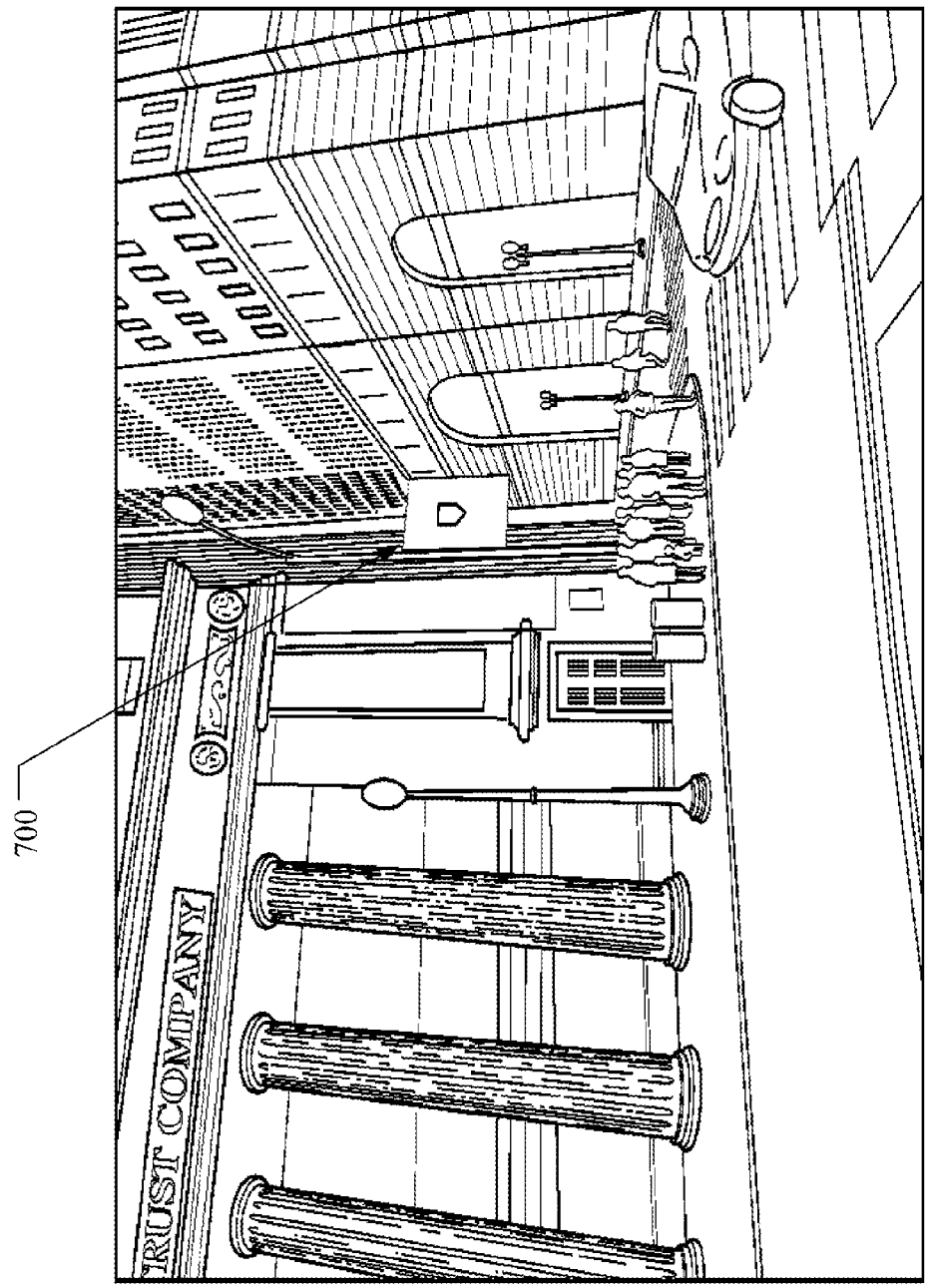
Figure 7D:
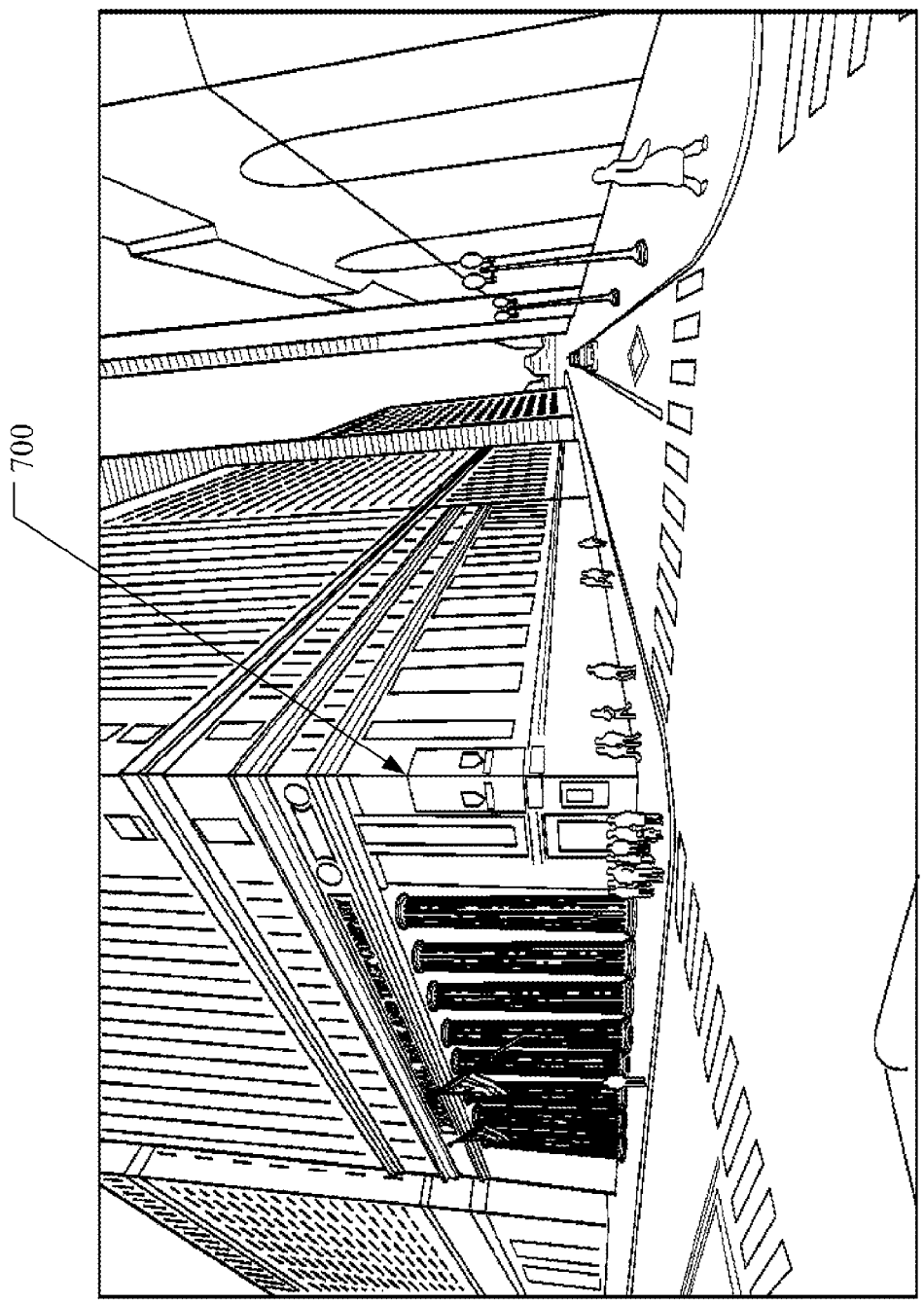
Figure 7E:
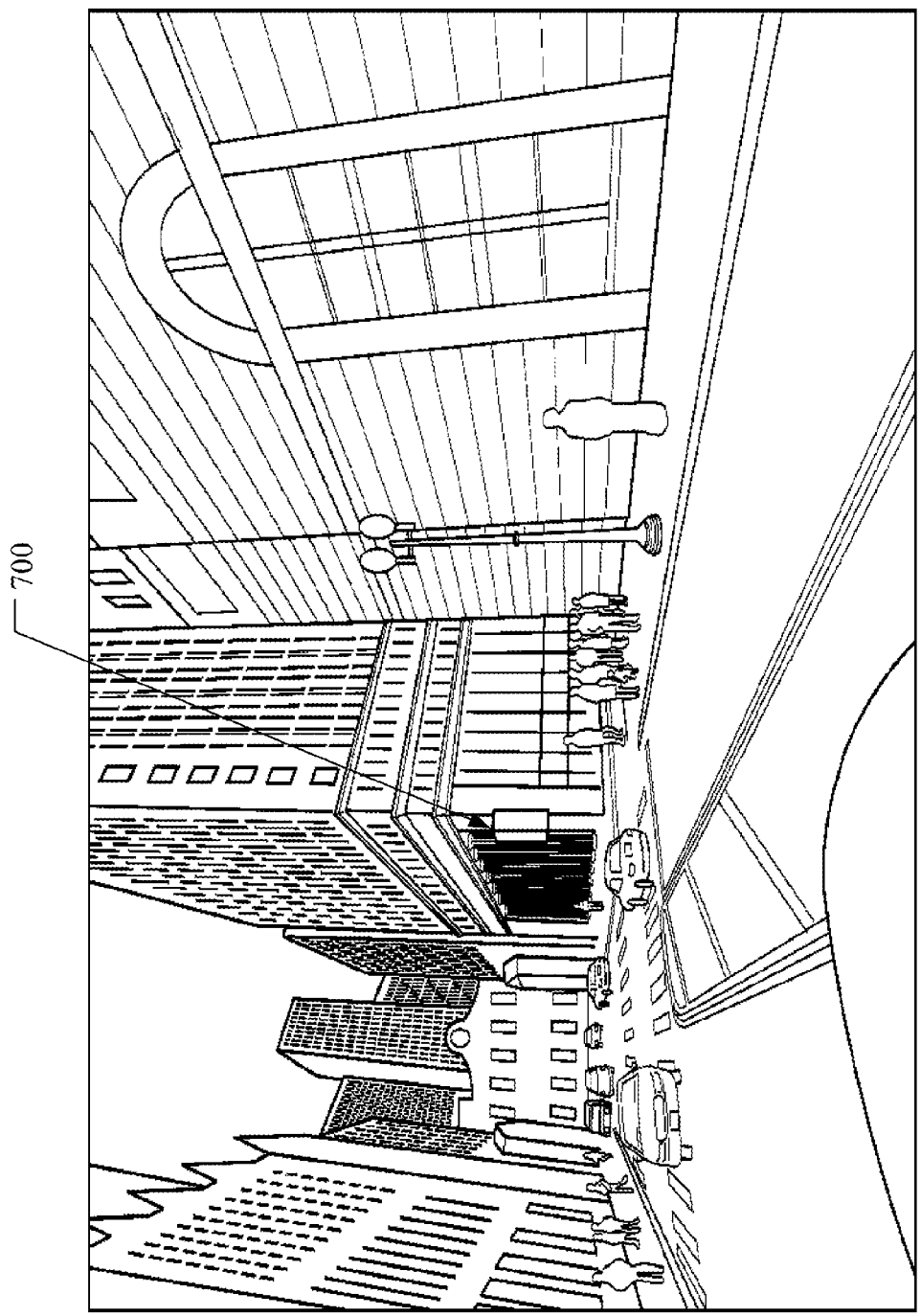
Figure 8A:
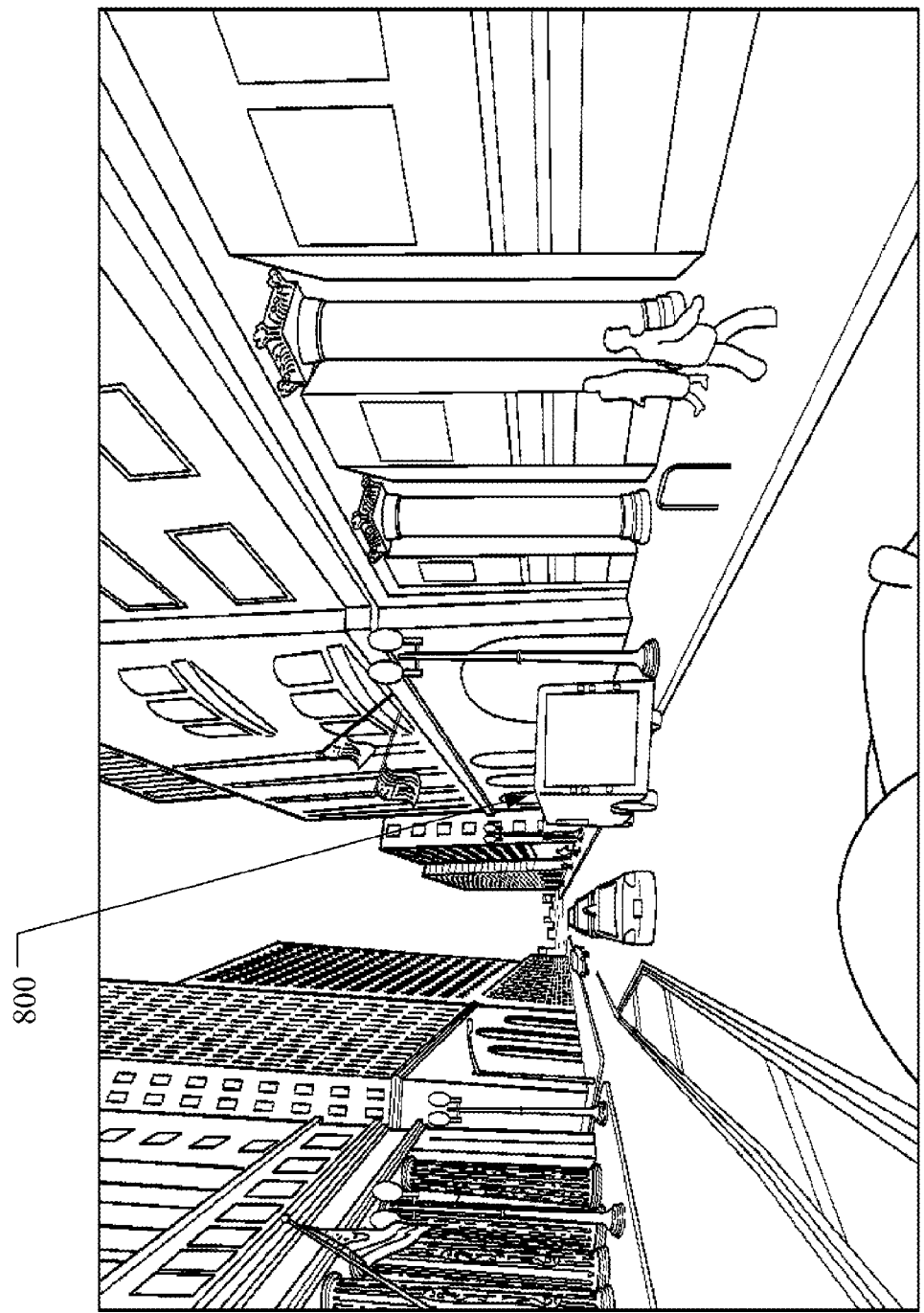
FIG. 8A through 8E are views of the same street locality and same image dataset as in FIG. 7A through 7E, but, according to aspects of the present invention, the views are directed toward a different object-of-interest.
Figure 8B:
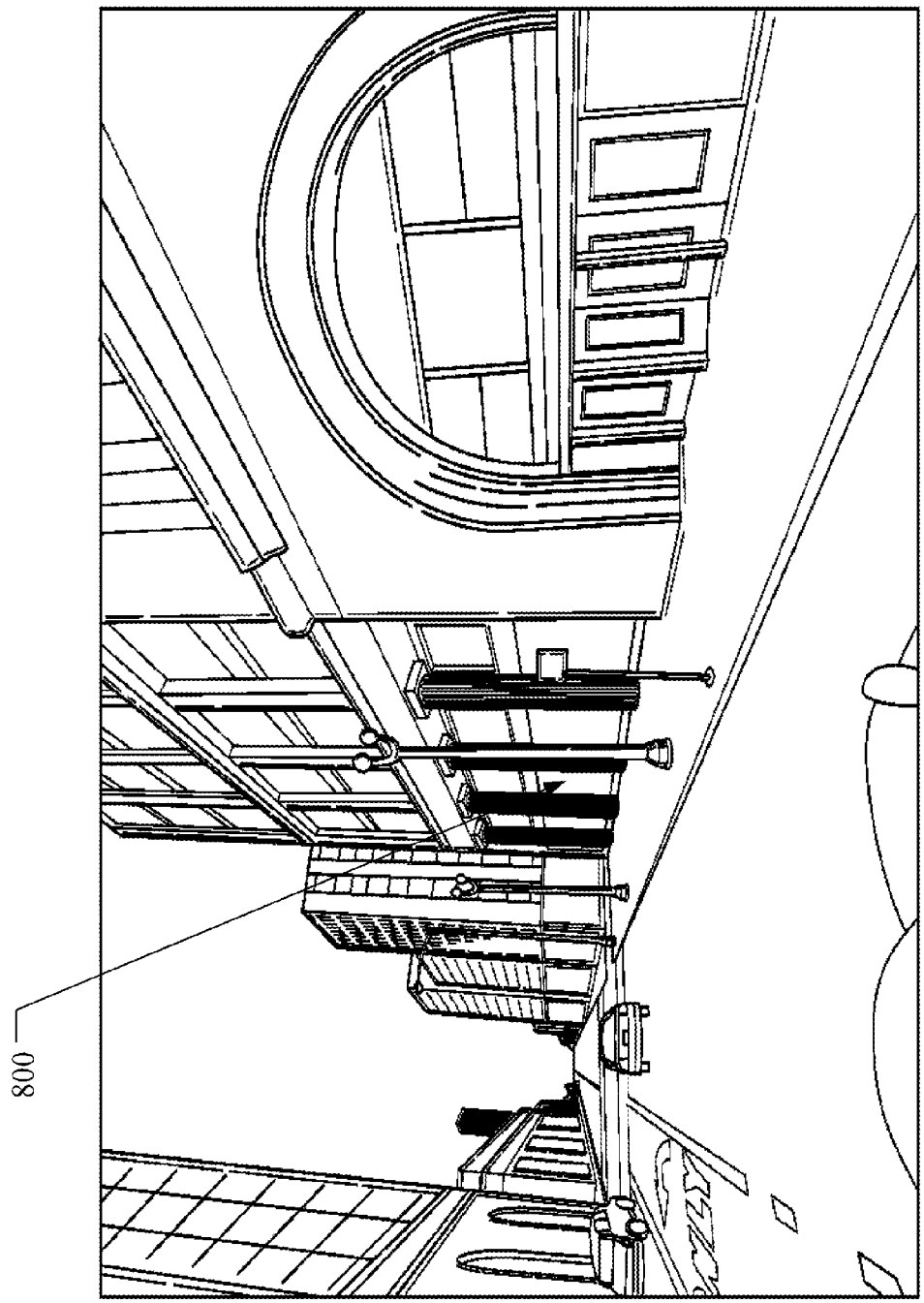
Figure 8C:
Figure 8D:
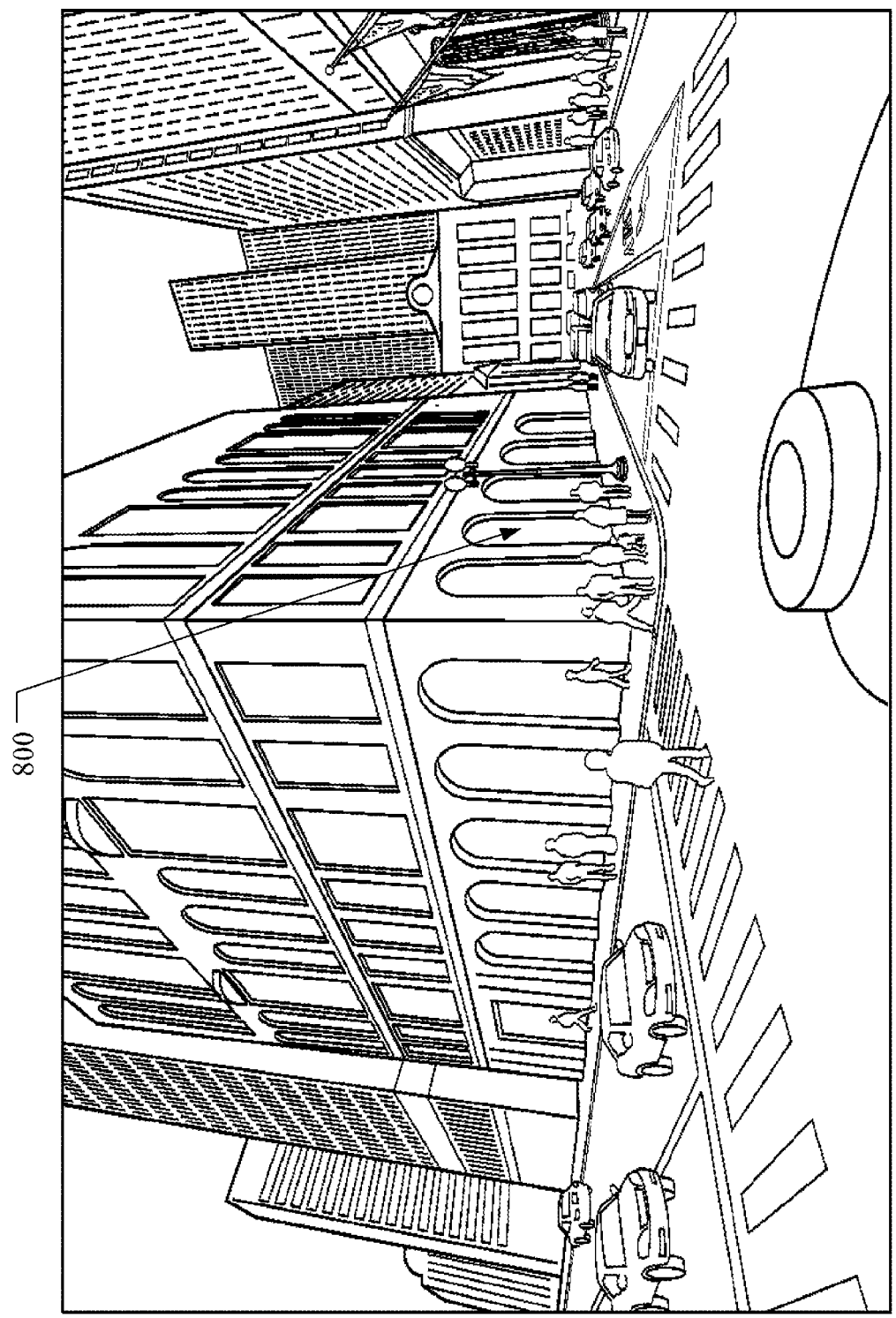
Figure 8E:
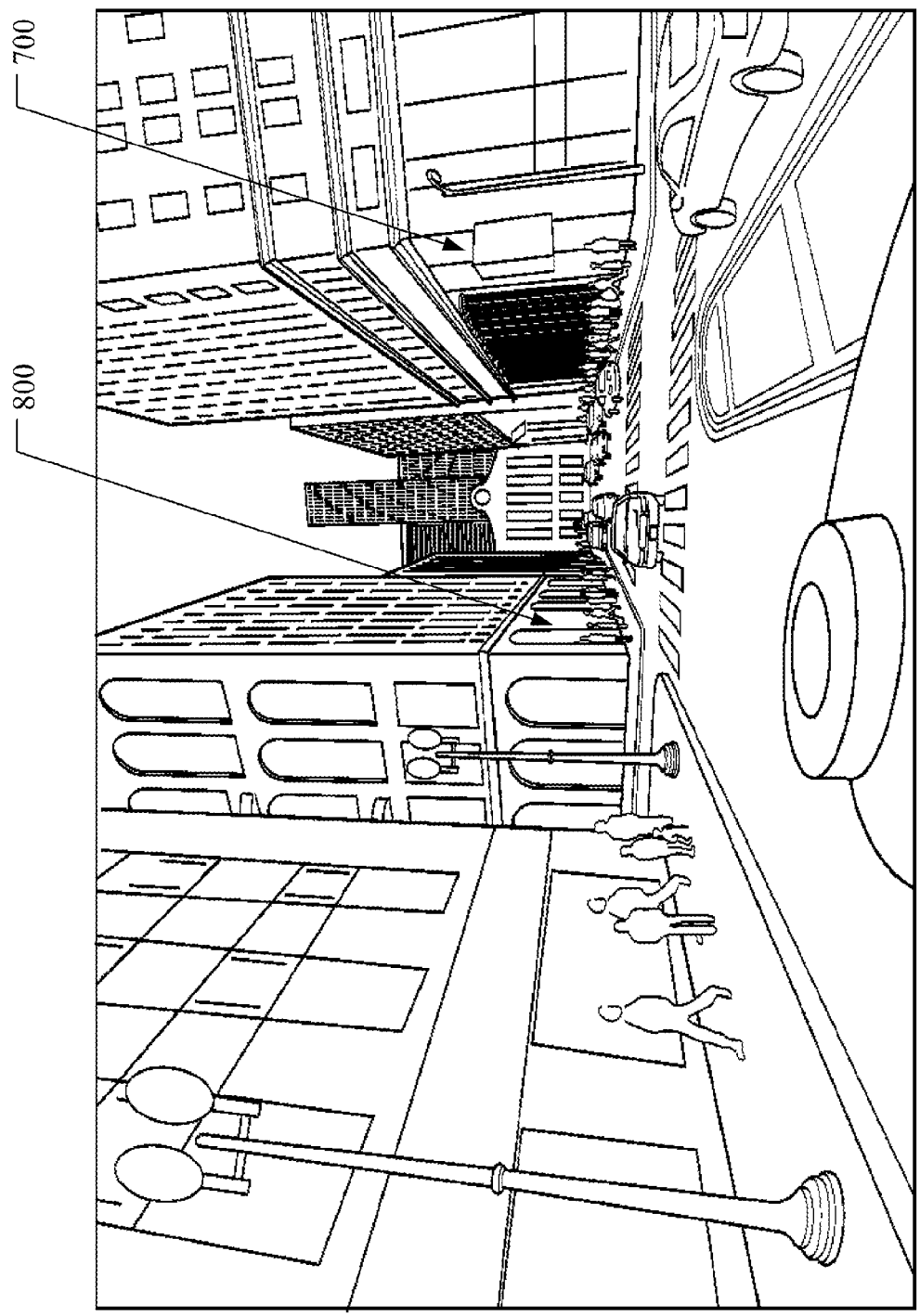

FIGS. 6 through 8 illustrate some of the results achievable by the system of FIGS. 4 and 5. FIG. 6 shows the same neighborhood as in FIG. 3C. As an image-capture system 204 makes a pass through the neighborhood, it repeatedly captures a panorama of the scene around it using a multi-lens camera. This is illustrated in FIG. 6 by the small arrows pointing in several directions from the image-capture locations 600. (The discrete locations 600 in FIG. 6 are illustrative: In some embodiments, the image-capture process is continuous.) These captured images are stored in an image dataset 400. Later after the images are processed and stored in the image dataset 400, when an object-of-interest is selected, the images in the image dataset 400 are processed to produce views looking toward the object-of-interest. In FIG. 6, the processed view at each virtual location 600 is represented by the large arrow directed toward the selected object-of-interest. Although in some embodiments, the camera in the image-capture system 204 has a fixed orientation, the result produced for the user is that of a camera rotating to point toward the selected object-of-interest. As all of the images gathered in the neighborhood are available for processing, views from essentially any location toward any selected object-of-interest can be produced without requiring additional image-capture passes.

FIGS. 7 and 8 together illustrate the flexibility of aspects of the disclosed embodiments in processing images taken in the same image-capture pass to produce multi-angle views of different objects-of-interest. First, images were captured in multiple directions during a pass down a city street. Then, a first object-of-interest 700 was selected: It is on a corner on the left side of the street. The captured images were processed to produce the series of multi-angle views 7A through 7E looking toward the selected object-of-interest 700 as the user's virtual viewpoint progresses down the street. Next, a second object-of-interest 800 was selected: It is a window of a building on the right side of the street. Without making another image-capture pass, the captured images were again processed to produce the series of multi-angle views 8A through 8E looking toward the second object-of-interest 800. For reference, FIG. 8E, looking back, shows both the first 700 and the second 800 objects-of-interest.

In some embodiments, the user's virtual viewpoint includes a specification of time as well as of geographic location. (Step 502.) If the image dataset 400 contains the requisite information, then the user can view the object-of-interest through time (e.g., as the seasons progress) as well as across space.

Because the images in the image dataset 400 are often taken from public streets, they may include people, vehicles, and other transient objects that would be of no use to a user wishing to view his object-of-interest. Furthermore, objects (e.g., trees or the intervening structure 308 in FIG. 3D) may obscure the object-of-interest. Also, for privacy concerns, it may be desired to remove or to blur views of pedestrians. Ser. No. 11/980,003 teaches techniques useful for removing these visual objects before the created multi-angle views are presented to the user. (This processing is an optional part of step 506 of FIG. 5.) The following is a summary of aspects of Ser. No. 11/980,003. The system in FIG. 4 optionally includes an object evaluator 410. The evaluator 410 reviews the visual objects represented by data in the image dataset 400 and determines which, if any, of these objects are of concern. The chosen objects are then removed or otherwise de-emphasized (e.g., made semi-transparent) by the object replacer 412. If removal of a visual object leaves a "visual hole," then several techniques can be applied by the object replacer 412 to fill this visual hole. For example, data from other images are used, after processing for the different angles of view of the images. Using the scenario of FIG. 3D as an illustration, an image taken from the viewpoint 304 can be combined with an image taken from the viewpoint 306 to present an unobstructed view of the object-of-interest 302. In some cases, it may be necessary to use information surrounding the visual hole as texture to fill in the hole.

The virtual-object adder 414 is useful when the object-of-interest does not actually exist in the images in the image dataset 400. For example, a virtual landscaping application can add objects such as flower planters and trees to the street scene to assess their aesthetic appeal. Signs, bus stops, and other functional elements can be added, and their utility tested (e.g., whether a street sign visible from a sufficient distance and through a sufficient angle of view).

The multi-angle views can be accessed from a device such as the exemplary computing platform 900 shown in FIG. 9. This platform 900 runs one or more applications 902 including, for example, the image-based navigation application 402 as discussed above. For this application 402, the user navigates using tools provided by an interface 906 (such as a keyboard, mouse, microphone, voice recognition software, and the like). In response, the application 402 produces multi-angle views based on information from the image dataset 400 and displays the views on the display 908 of the user's interface 906.

Some embodiments of the computing platform 900 include access to a geographic information database 904. Using this database 904, the platform 900 can provide navigation-related applications 902 such as route calculation, route guidance, destination selection, electronic yellow pages, vehicle positioning, and map display. Other applications 902 are also possible. This geographic database 904 can include data about the geographic area in which a user is located. In some embodiments, the geographic database 904 includes data about the roads in the geographic area, including data indicating the locations of the roads and intersections. The geographic database 904 may also include information about the names of the roads, one-way streets, number of lanes, locations of traffic signals and signs, speed limits, turn restrictions, address ranges, and so on. The geographic database 904 may also include information about objects of interest, such as businesses, landmarks, museums, ATMs, government offices, and so on. In some embodiments, the data in the geographic database 904 are in a format that is optimized for providing navigation-related functions.

In some embodiments, applications 902 have access to information from a positioning system 910, such as a GPS device. If the computing platform is in a vehicle, such as vehicle 912, the positioning system 910 may include inertial sensors, differential wheel-speed sensors, a compass, or other equipment that facilitates determining the position of the user. The position may be determined as geographic coordinates (latitude, longitude, and altitude), street address, or in any other way.

In some embodiments, the computing platform 900 is a combination of hardware, software, and data. The platform 900 can be installed in a vehicle 912 as an in-vehicle navigation system but may also be installed on a special-purpose, handheld navigation device, on a personal digital assistant, on a personal computer, or on a mobile telephone supporting a navigation application. The computing platform 900 may be a standalone platform in which the hardware, software, and data are all located locally. Alternatively, the computing platform 900 may be connected to a network, e.g., the Internet or a wireless network. In some embodiments, the image dataset 400 and the geographic database 904 are located remotely from the computing platform 900 and are accessed via the network. In some embodiments, the image dataset 400 and database 904 are local to the computing platform 900, but updates are received over the network. Some applications 902 can also be provided, in whole or in part, over the network.

In view of the many possible embodiments to which the principles of this invention may be applied, it should be recognized that the embodiments described herein with respect to the drawing figures are meant to be illustrative only and should not be taken as limiting the scope of the invention. For example, embodiments in some environments may take advantage of other image-capture systems or may support end-user applications other than those illustrated. Therefore, the invention as described herein contemplates all such embodiments as may come within the scope of the following claims and equivalents thereof.

We claim:

1. A method for using images in a photo image dataset to produce multi-angle views of an object-of-interest in a navigation system, the method comprising:
   specifying a first viewpoint location;
   based, at least in part, on a photo image read from the photo image dataset, producing a first photo image view of the object-of-interest as seen from the first viewpoint location, the photo image dataset including multiple photo images taken via a collection vehicle at different respective points along a road and accessible for one or more users remote from the collection vehicle, wherein the photo image dataset is stored on a non-transitory computer readable medium;
   providing the first photo image view of the object-of-interest to display the first photo image view locally to at least one of the one or more users;
   specifying a second viewpoint location;
   associating at least portions of the photo image with range distance data;
   transforming photo images read from the photo image dataset based on the range distance data to create another image with a second photo image view of the object-of-interest as seen from the second viewpoint location, wherein the second photo image view is different than the first photo image view; and
   providing the second photo image view of the object-of-interest to display the second photo image view locally to the at least one or another of the one or more users.

2. The method of claim 1 wherein the photo image dataset comprises multiple images taken from multiple points of view, at least some of which images overlap.

3. The method of claim 1 wherein the photo image dataset represents a real-world locality.

4. The method of claim 1 wherein the object-of-interest is selected from the group consisting of: a structure, a landmark, and a location.

5. The method of claim 1 further comprising:
specifying a location of the object-of-interest,
wherein specifying the location of the object-of-interest comprises specifying a location in 3D space.

6. The method of claim 1 further comprising:
stitching together the photo images taken on different image-capture passes along a driving path.

7. The method of claim 1 wherein the photo image dataset comprises a time coordinate for at least some photo images in the photo image dataset, the method further comprising:
specifying a first time associated with the first viewpoint location;
wherein producing the first photo image view of the object-of-interest as seen from the first viewpoint location is based, at least in part, on photo images read from the photo image dataset whose time coordinates are correlated to the first time associated with the first viewpoint location.

8. The method of claim 7 further comprising:
specifying a second time associated with the second viewpoint location;
wherein producing the second photo image view of the object-of-interest as seen from the second viewpoint location is based, at least in part, on photo images read from the photo image dataset whose time coordinates are correlated to the second time associated with the second viewpoint location.

9. The method of claim 1 wherein the photo image dataset comprises data representing a first object and a second object, the first object at least partially occluding the second object from at least one point of view, the method further comprising:
determining relative positions of the first and second objects; and
based, at least in part, on the relative positions of the first and second objects, transforming one or more photo images of the photo image dataset to reveal the second object.

10. A non-transitory computer-readable medium containing computer-executable instructions for performing a method for using images in a photo image dataset to produce multi-angle views of an object-of-interest in a navigation system, the method comprising:
specifying a first viewpoint location;
based, at least in part, on a photo image read from the photo image dataset, producing a first photo image view of the object-of-interest as seen from the first viewpoint location, the photo image dataset including multiple photo images taken via a collection vehicle at different respective points along a road and accessible for one or more users remote from the collection vehicle;
providing the first photo image view of the object-of-interest to display the first photo image view;
specifying a second viewpoint location;
associating at least portions of the photo image with range distance data
interpolating the photo images read from the photo image dataset according to the range distance data to create another image with a second photo image view of the object-of-interest as seen from the second viewpoint location wherein the second photo image view is different than the first photo image view; and
providing the second photo image view of the object-of-interest to display the second photo image view.

11. A navigation device for using images in a video image dataset to produce multi-angle views of an object-of-interest, the navigation device method comprising:
a user interface configured to specify a first viewpoint location;
a display configured to display a first video image view of the object-of-interest as seen from the first viewpoint location, wherein based, at least in part, on a video image read from the video image dataset, the first video image view of the object-of-interest as seen from the first viewpoint location is generated to display, the video image dataset including multiple video images taken via a collection vehicle at different respective points along a road and accessible for one or more users remote from the collection vehicle;
wherein the user interface is further configured to specify a second viewpoint location; and
wherein the display is further configured to display a second video image view of the object-of-interest as seen from the second viewpoint location, wherein based, at least in part, on video images read from the video image dataset, the second video image view of the object-of-interest as seen from the second viewpoint location is generated to display, and wherein the second video image view of the object-of-interest is generated by stitching together video images in the video image dataset according to range distance data associated with the video images, the second video image view different than the first video image.

12. The method of claim 1 further comprising:
stitching together the photo images taken on different image-capture passes of the collection vehicle, or another collection vehicle.

13. The method of claim 1, wherein transforming photo images read from the photo image dataset comprises interpolating data from the photo images to produce the second photo image view.

14. The method of claim 1, wherein the range distance data is collected by a range finding device in the collection vehicle.

15. The method of claim 14, wherein the range finding device is a light detection and ranging (LIDAR) device.

16. The method of claim 1, wherein pixels of the photo image are associated with range distance data.

17. The non-transitory computer-readable medium of claim 10, wherein the range distance data is collected by a range finding device in the collection vehicle.

* * * * *